United States Patent
Lin et al.

(10) Patent No.: US 11,445,456 B2
(45) Date of Patent: Sep. 13, 2022

(54) METHOD AND APPARATUS FOR RMSI RECEPTION FOR LOW COST UES IN NR

(71) Applicant: Samsung Electronics Co., Ltd., Suwon-si (KR)

(72) Inventors: Qiongjie Lin, Sunnyvale, CA (US); Hongbo Si, Plano, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/946,408

(22) Filed: Jun. 19, 2020

(65) Prior Publication Data

US 2021/0007066 A1 Jan. 7, 2021

Related U.S. Application Data

(60) Provisional application No. 62/947,278, filed on Dec. 12, 2019, provisional application No. 62/870,410,
(Continued)

(51) Int. Cl.
*H04W 56/00* (2009.01)
*H04W 72/00* (2009.01)
(Continued)

(52) U.S. Cl.
CPC ......... *H04W 56/001* (2013.01); *H04L 1/0003* (2013.01); *H04L 5/0051* (2013.01);
(Continued)

(58) Field of Classification Search
CPC ............. H04W 56/001; H04W 72/005; H04W 72/042; H04W 72/1273; H04W 72/0493;
(Continued)

(56) References Cited

U.S. PATENT DOCUMENTS

2018/0302889 A1  10/2018  Guo et al.
2019/0159136 A1  5/2019  MolavianJazi et al.
(Continued)

FOREIGN PATENT DOCUMENTS

KR   10-2019-0051731 A   5/2019

OTHER PUBLICATIONS

International Search Report and Written Opinion of the International Searching Authority in connection with International Application No. PCT/KR2020/008727 dated Oct. 13, 2020, 10 pages.
(Continued)

*Primary Examiner* — Kevin C. Harper
*Assistant Examiner* — Henry Baron

(57) ABSTRACT

A method and apparatus of a user equipment (UE) are provided. The method and apparatus comprise receiving a synchronization signal/physical broadcast channel (SS/PBCH) block that includes configuration information for one or more search space sets and determining scheduling information for a first physical downlink shared channel (PDSCH) reception based on one of: a first downlink control information (DCI) format associated with a first search space set from the one or more search space sets, wherein the first DCI format includes the scheduling information for the first PDSCH reception and for a second PDSCH reception, or a second DCI format associated with a second search space set from the one or more search space sets, wherein the second DCI format includes the scheduling information for the first PDSCH reception. The method and apparatus of the UE further comprise receiving the first PDSCH based on the scheduling information.

20 Claims, 27 Drawing Sheets

Related U.S. Application Data filed on Jul. 3, 2019, provisional application No. 62/870,344, filed on Jul. 3, 2019.

(51) Int. Cl.
| | |
|---|---|
| *H04W 72/04* | (2009.01) |
| *H04W 72/12* | (2009.01) |
| *H04W 68/00* | (2009.01) |
| *H04W 76/11* | (2018.01) |
| *H04W 74/08* | (2009.01) |
| *H04L 1/00* | (2006.01) |
| *H04L 5/10* | (2006.01) |
| *H04L 5/00* | (2006.01) |

(52) U.S. Cl.
CPC ............ *H04L 5/10* (2013.01); *H04W 68/005* (2013.01); *H04W 72/005* (2013.01); *H04W 72/042* (2013.01); *H04W 72/0446* (2013.01); *H04W 72/0493* (2013.01); *H04W 72/1273* (2013.01); *H04W 74/0833* (2013.01); *H04W 76/11* (2018.02)

(58) Field of Classification Search
CPC .............. H04W 68/005; H04W 76/11; H04W 74/0833; H04W 72/0446; H04L 5/0051; H04L 1/0003; H04L 5/10
See application file for complete search history.

(56) References Cited

U.S. PATENT DOCUMENTS

| | | | |
|---|---|---|---|
| 2019/0200307 A1 | 6/2019 | Si et al. | |
| 2019/0254110 A1 | 8/2019 | He et al. | |
| 2020/0221428 A1* | 7/2020 | Moon | .................... H04B 7/024 |
| 2021/0006376 A1* | 1/2021 | Cirik | .................... H04L 5/0094 |

OTHER PUBLICATIONS

Qualcomm Incorporated, "Initial access and mobility procedures for NR unlicensed," R1-1907262, 3GPP TSG RAN WG1 Meeting #97, Reno, US, May 13-17, 2019, 16 pages.

"3rd Generation Partnership Project; Technical Specification Group Radio Access Network; NR; Physical channels and modulation (Release 16)", 3GPP TS 38.211 V16.1.0, Mar. 2020, 73 pages.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"3rd Generation Partnership Project; Technical Specification Group Radio Access Network; NR; Physical layer measurements (Release 16)", 3GPP TS 38.215 V16.1.0, Mar. 2020, 22 pages.

"3rd Generation Partnership Project; Technical Specification Group Radio Access Network; NR; Medium Access Control (MAC) protocol specification (Release 16)", 3GPP TS 38.321 V16.0.0, Mar. 2020, 141 pages.

"3rd Generation Partnership Project; Technical Specification Group Radio Access Network; NR; Radio Resource Control (RRC) protocol specification (Release 16)", 3GPP TS 38.331 v16.0.0, Mar. 2020, 835 pages.

Extended European Search Report dated Jul. 15, 2022 regarding Application No. 20835110.6, 9 pages.

NTT Docomo, Inc., "Offline summary for AI 7.1.3.1.1 PDCCH structure for URLLC", 3GPP TSG RAN WG1 Meeting #93, R1-1807637, May 2018, 31 pages.

\* cited by examiner

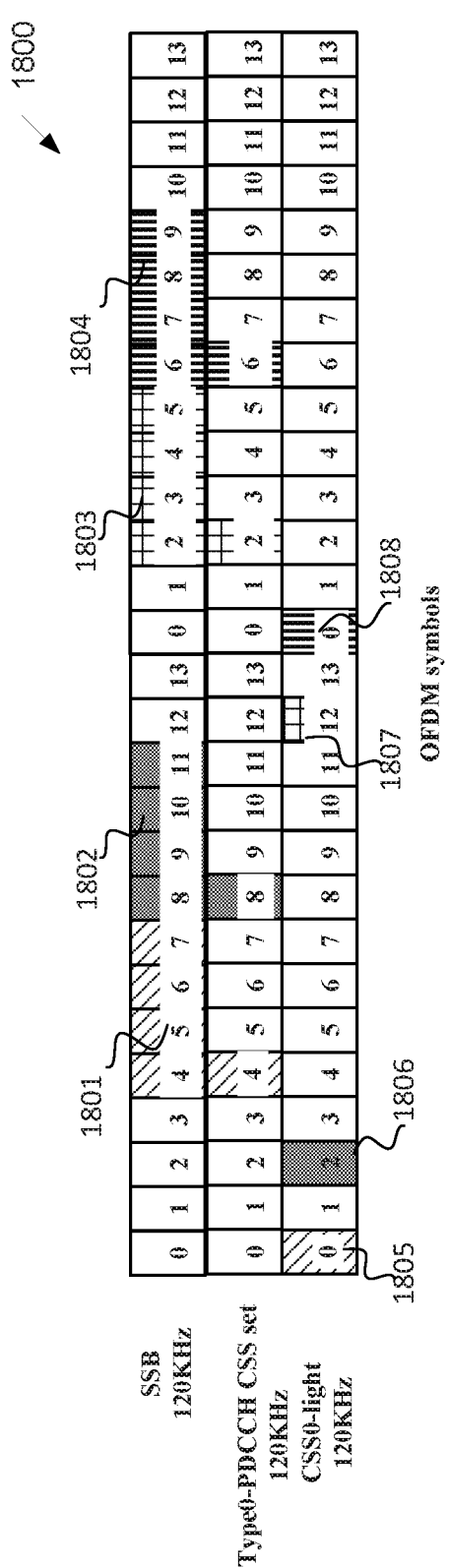
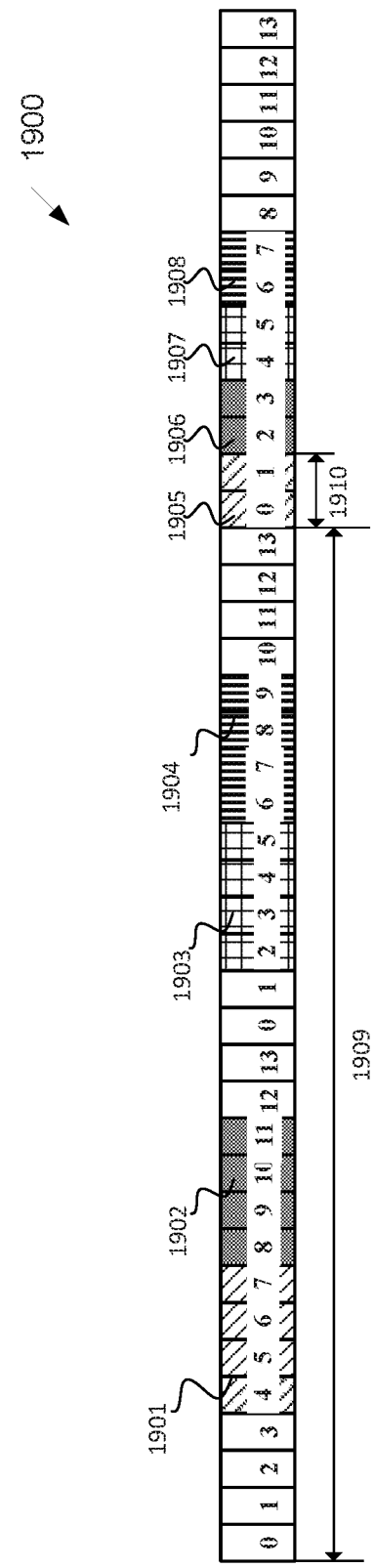
FIG. 18
FIG. 19

METHOD AND APPARATUS FOR RMSI RECEPTION FOR LOW COST UES IN NR

CROSS-REFERENCE TO RELATED APPLICATIONS AND CLAIM OF PRIORITY

The present application claims priority to:
U.S. Provisional Patent Application No. 62/870,344, filed on Jul. 3, 2019;
U.S. Provisional Patent Application No. 62/870,410, filed on Jul. 3, 2019; and
U.S. Provisional Patent Application No. 62/947,278, filed on Dec. 12, 2019.
The content of the above-identified patent document is incorporated herein by reference.

TECHNICAL FIELD

The present application relates generally to wireless communication systems, more specifically, the present disclosure relates to remaining minimum system information (RMSI) reception for low cost UEs in NR.

BACKGROUND

A communication system includes a downlink (DL) that conveys signals from transmission points such as base stations (BSs) or NodeBs to user equipments (UEs) and an uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB (eNB), referring to a NodeB in long-term evolution (LTE) communication system, and a gNodeB (gNB), referring to a NodeB in new radio (NR) communication system, may also be referred to as an access point or other equivalent terminology.

SUMMARY

The present disclosure relates to a RMSI reception for low cost UEs in NR.

In one embodiment, a user equipment (UE) is provided the UE comprises a transceiver configured to receive a synchronization signal/physical broadcast channel (SS/PBCH) block that includes configuration information for one or more search space sets. The UE further comprises a processor operably connected to the transceiver, the processor configured to determine scheduling information for a first physical downlink shared channel (PDSCH) reception based on one of: a first downlink control information (DCI) format associated with a first search space set from the one or more search space sets, wherein the first DCI format includes the scheduling information for the first PDSCH reception and for a second PDSCH reception, or a second DCI format associated with a second search space set from the one or more search space sets, wherein the second DCI format includes the scheduling information for the first PDSCH reception. The transceiver of the UE is further configured to receive the first PDSCH based on the scheduling information.

In another embodiment, a base station (BS) is provided. The BS comprises a processor configured to include configuration information for one or more search space sets in a synchronization signal/physical broadcast channel (SS/PBCH) block and include scheduling information for a first physical downlink shared channel (PDSCH) transmission in one of: a first downlink control information (DCI) format associated with a first search space set from the one or more search space sets, wherein the first DCI format includes the scheduling information for the first PDSCH transmission and for a second PDSCH transmission, or a second DCI format associated with a second search space set from the one or more search space sets, wherein the second DCI format includes the scheduling information for the first PDSCH transmission. The BS further comprises a transceiver operably connected to the processor, the transceiver configured to transmit the SS/PBCH block including the configuration information for the one or more search space sets and transmit the first PDSCH based on the scheduling information.

In yet another embodiment, a method of a user equipment (UE) is provided. The method comprises receiving a synchronization signal/physical broadcast channel (SS/PBCH) block that includes configuration information for one or more search space sets and determining scheduling information for a first physical downlink shared channel (PDSCH) reception based on one of: a first downlink control information (DCI) format associated with a first search space set from the one or more search space sets, wherein the first DCI format includes the scheduling information for the first PDSCH reception and for a second PDSCH reception, or a second DCI format associated with a second search space set from the one or more search space sets, wherein the second DCI format includes the scheduling information for the first PDSCH reception. The method of the UE further comprises receiving the first PDSCH based on the scheduling information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 18 illustrates yet another example monitoring occasions in CSS0-light according to embodiments of the present disclosure;

FIG. 19 illustrates an example explicit configuration of CSS0-light according to embodiments of the present disclosure;

DETAILED DESCRIPTION

FIG. 1 through FIG. 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation;" 3GPP TS 38.212 v16.1.0, "NR; Multiplexing and Channel coding;" 3GPP TS 38.213 v16.1.0, "NR; Physical Layer Procedures for Control;" 3GPP TS 38.214 v16.1.0, "NR; Physical Layer Procedures for Data;" 3GPP TS 38.215 v16.1.0, "NR; Physical layer measurements;" 3GPP TS 38.321 v16.0.0, "NR; Medium Access Control (MAC) protocol specification" and 3GPP TS 38.331 v16.0.0, "NR; Radio Resource Control (RRC) Protocol Specification."

Figure 1:
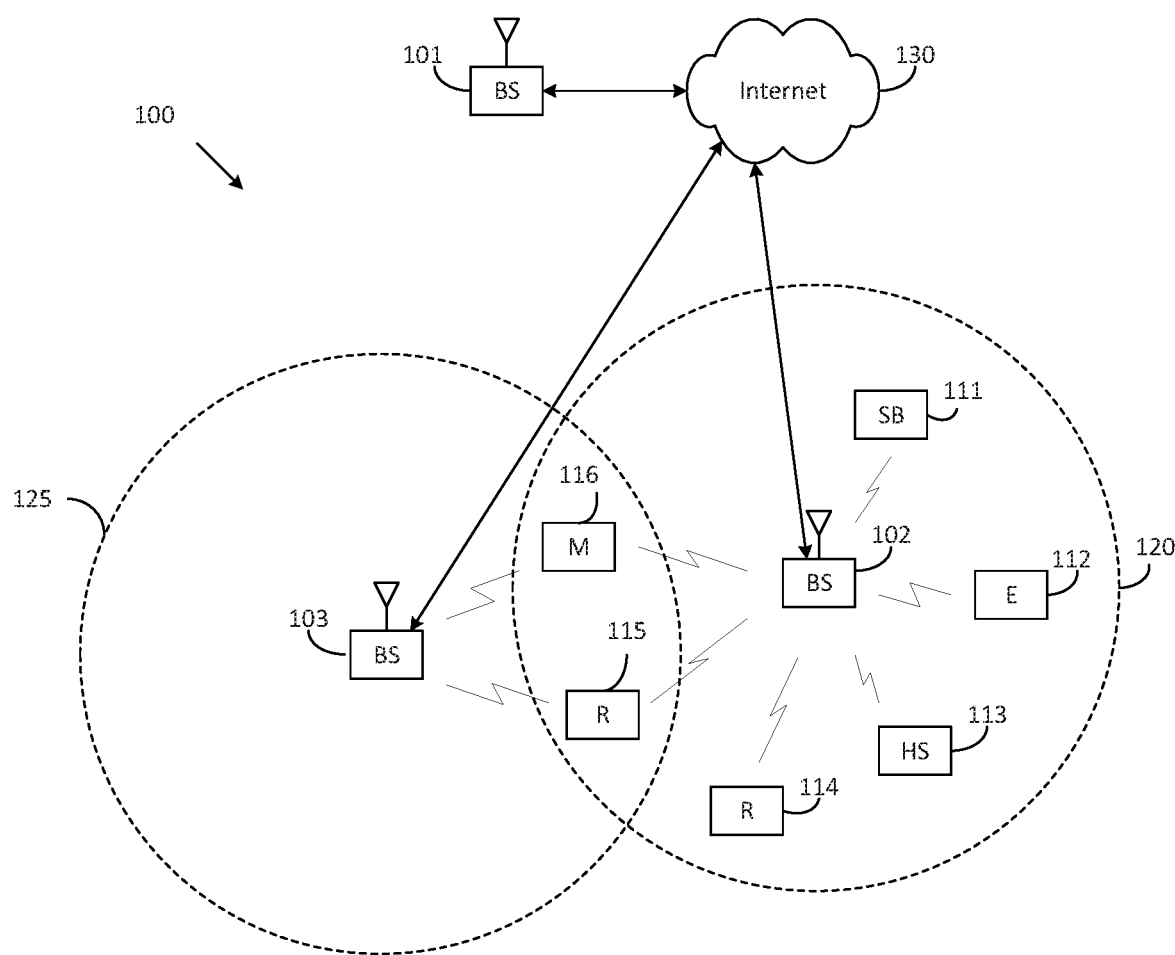
FIG. 1 illustrates an example wireless network according to embodiments of the present disclosure.
Figure 2:
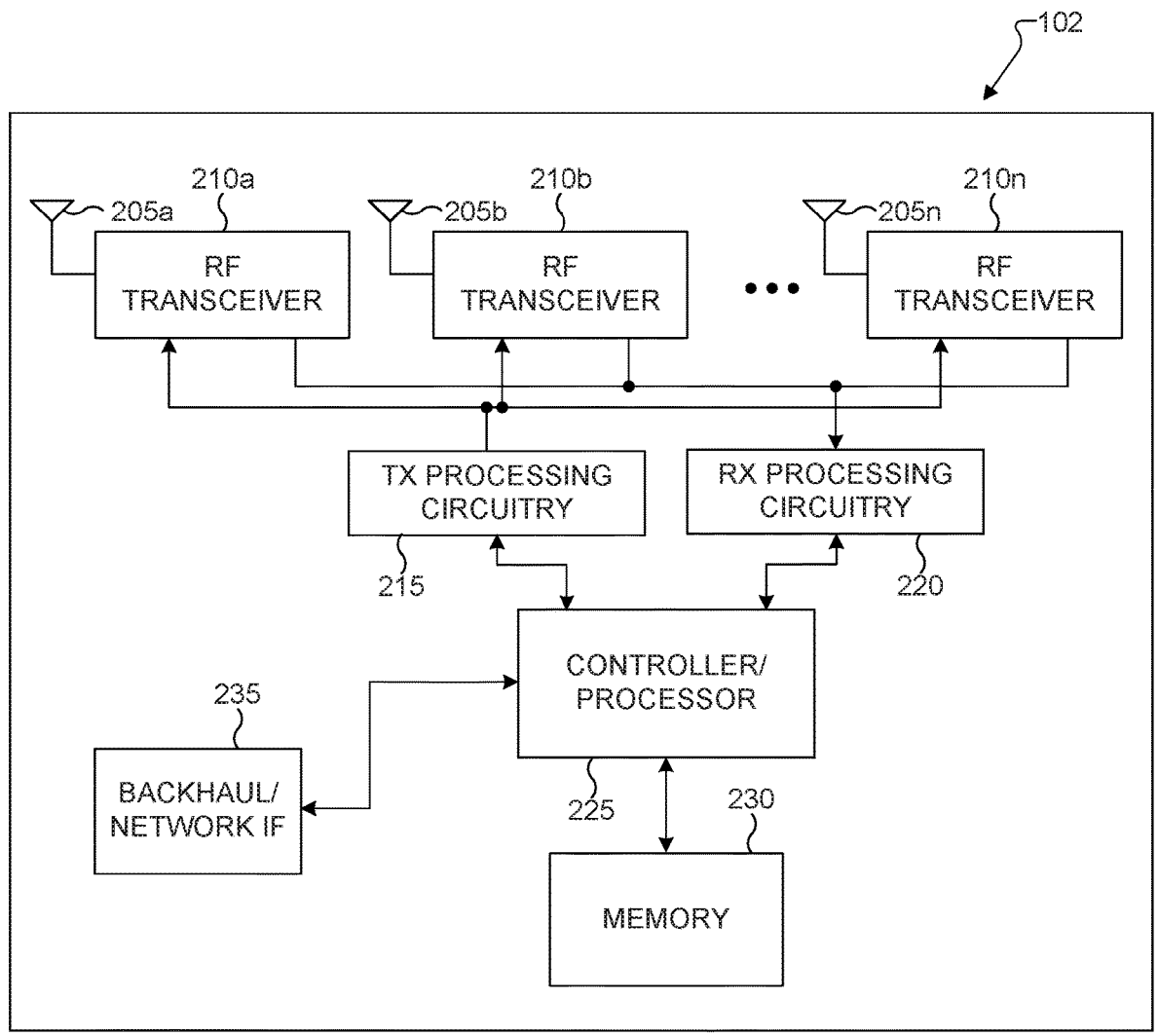
FIG. 2 illustrates an example gNB according to embodiments of the present disclosure.
Figure 3:
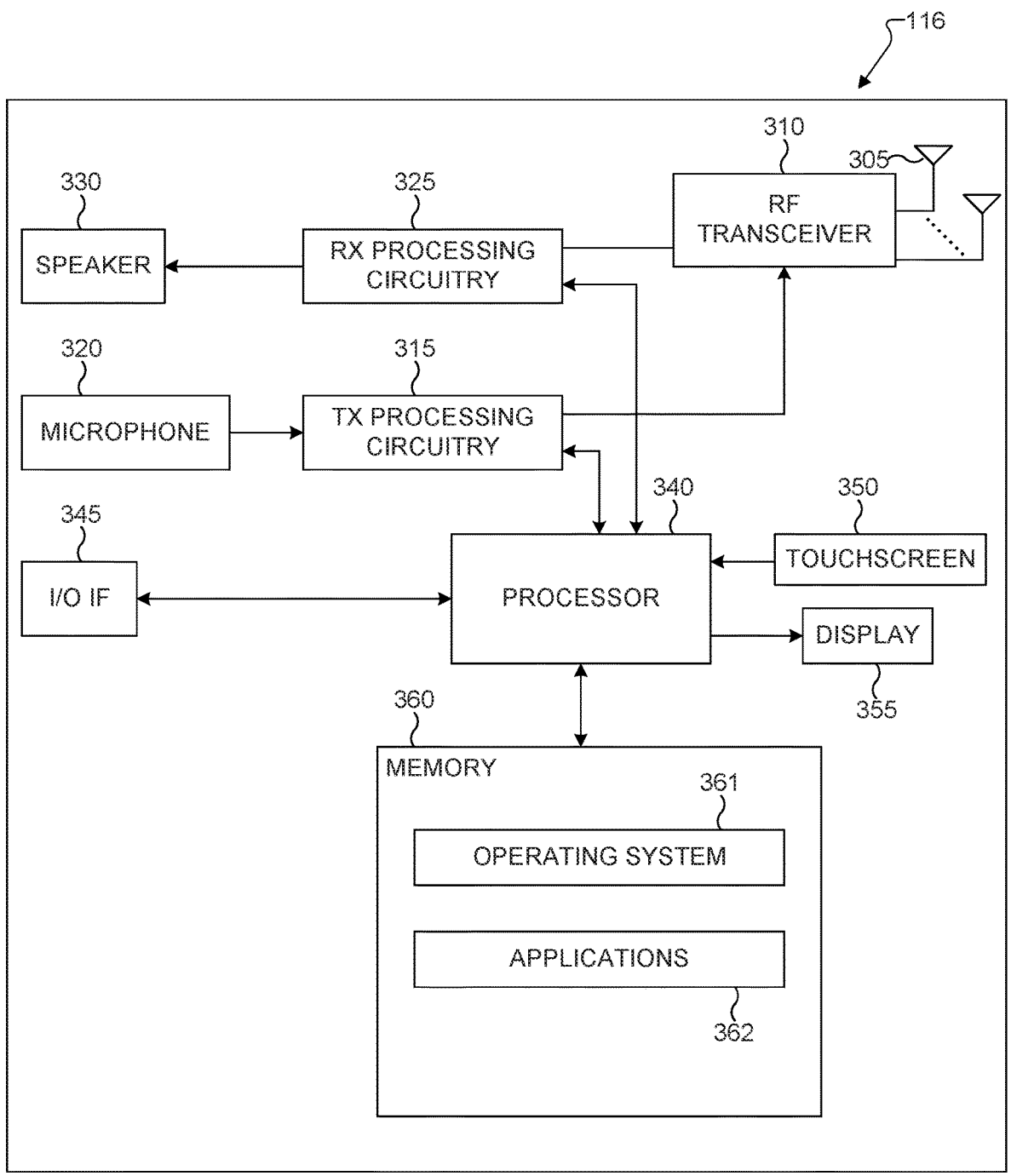
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
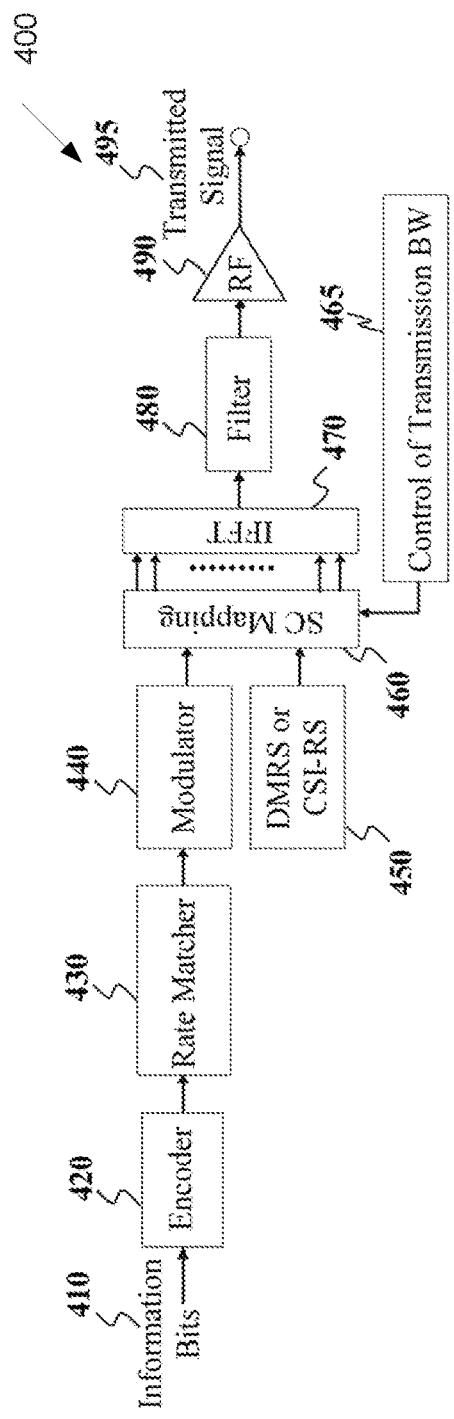
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping unit 465, an inverse fast Fourier transform (IFFT) is performed by filter 470, a cyclic prefix (CP) is added by CP insertion unit 480, and a resulting signal is filtered by filter 490 and transmitted by a radio frequency (RF) unit 495.

Figure 5:
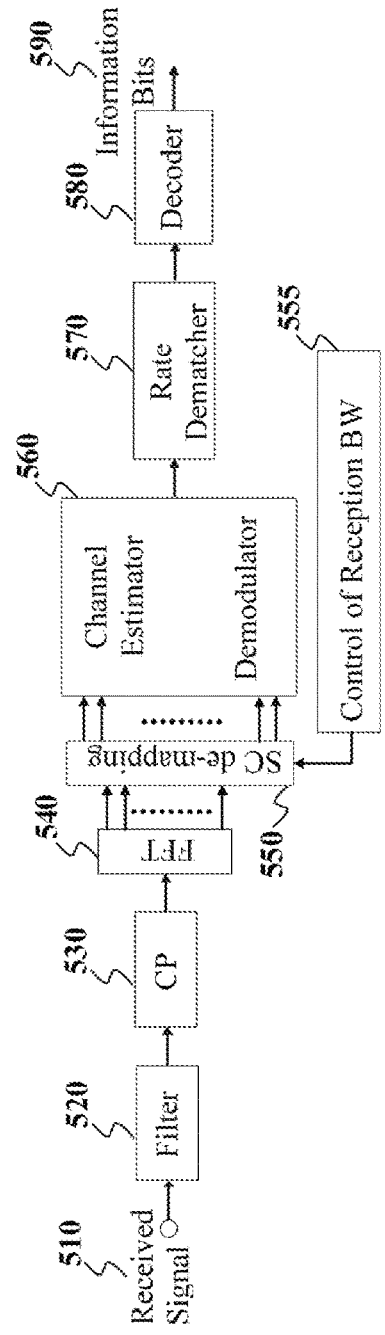
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal unit removes a CP 530, a filter 540 applies a fast Fourier transform (FFT), SCs de-mapping unit 550 de-maps SCs selected by BW selector unit 555, received symbols are demodulated by a channel estimator and a demodulator unit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
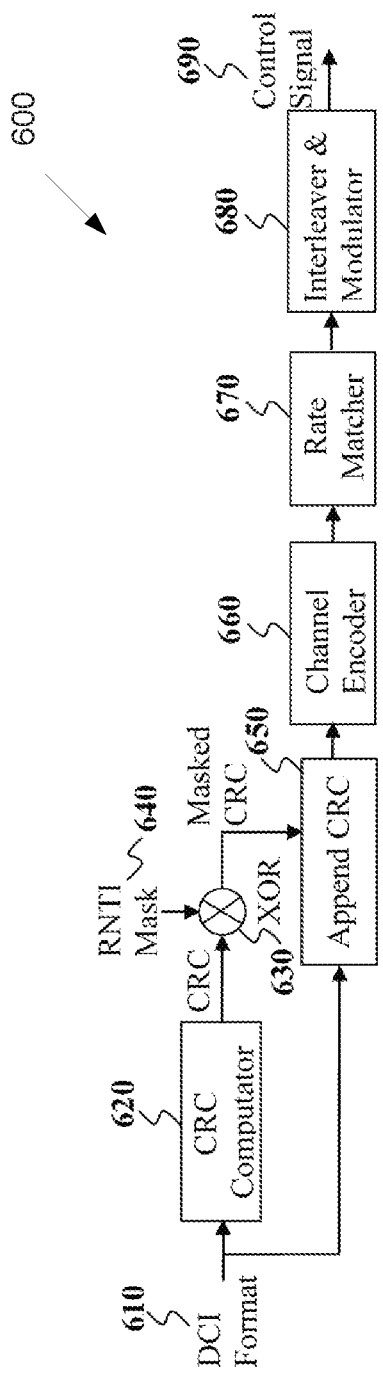
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation unit 620, and the CRC is masked using an exclusive OR (XOR) operation unit 630 between CRC bits and RNTI bits 640. The XOR operation is defined as XOR (0, 0)=0, XOR (0, 1)=1, XOR (1, 0)=1, XOR (1, 1)=0. The masked CRC bits are appended to DCI format information bits using a CRC append unit 650. An encoder 660 performs channel coding (such as tail-biting convolutional coding or polar coding), followed by rate matching to allocated resources by rate matcher 670. Interleaving and modulation units 680 apply interleaving and modulation, such as QPSK, and the output control signal 690 is transmitted.

Figure 7:
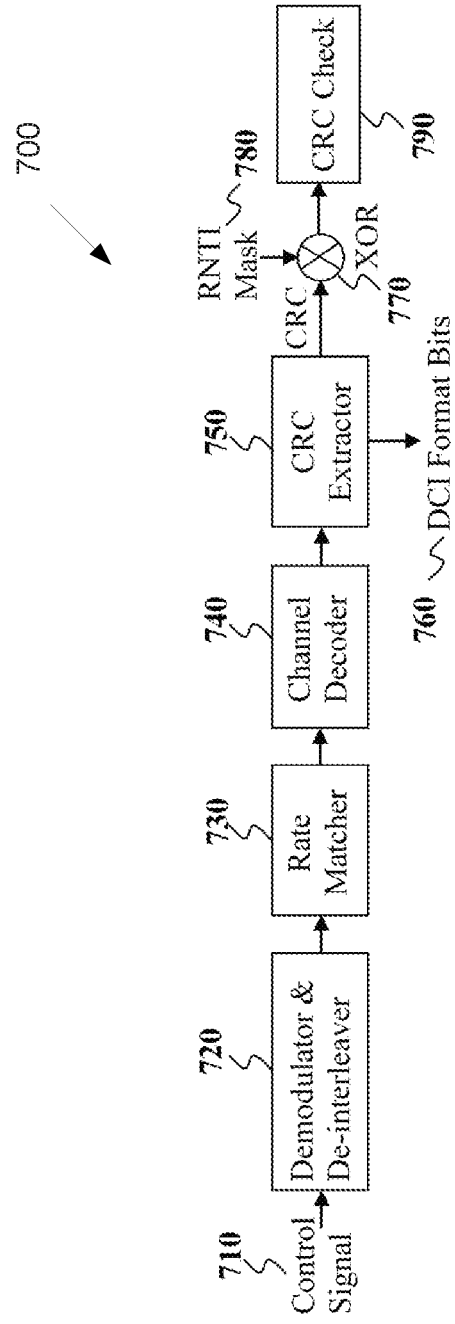
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by unit 790. When the CRC check succeeds (checksum is zero), the DCI format information bits are considered to be valid. When the CRC check does not succeed, the DCI format information bits are considered to be invalid.

Figure 8:
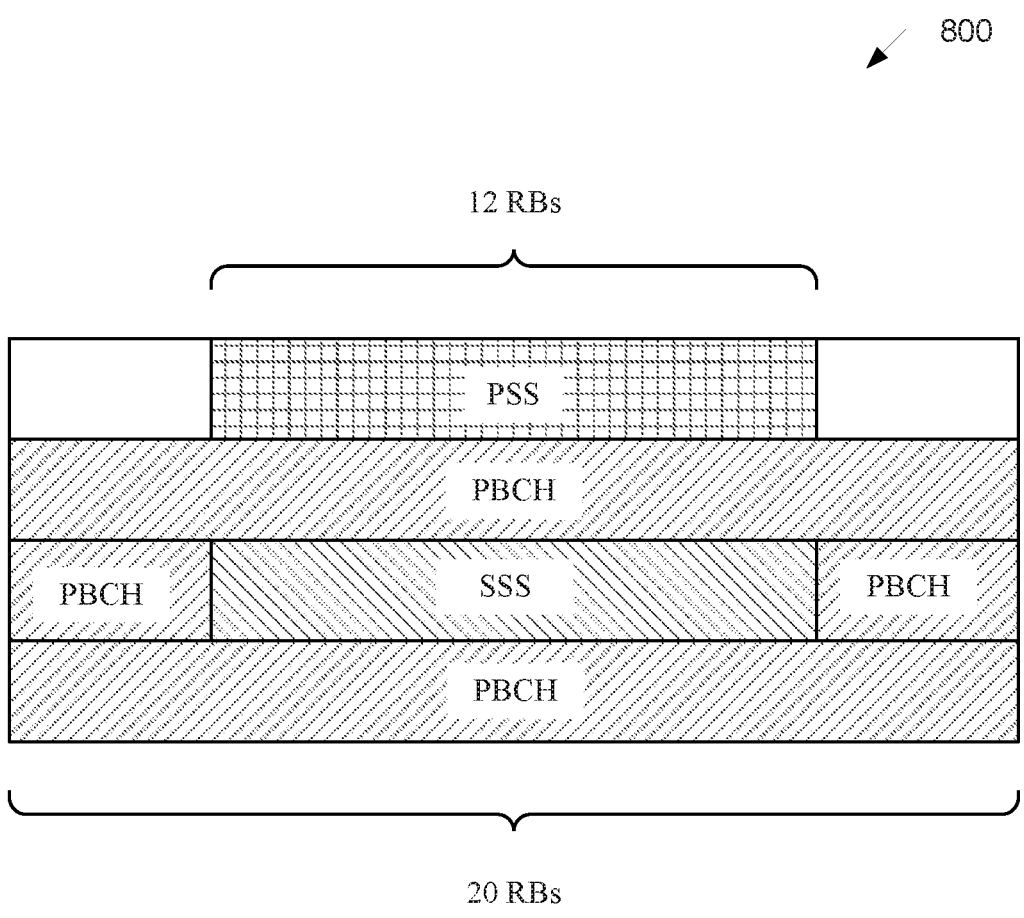
FIG. 8 illustrates an NR SS/PBCH block composition according to embodiments of the present disclosure.

FIG. 8 illustrates an NR SS/PBCH block composition 800 according to embodiments of the present disclosure. An embodiment of the NR SS/PBCH block composition 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

New radio (NR) also supports synchronization through synchronization signals transmitted on downlink. comparing to long-term evolution (LTE), NR supports larger range of carrier frequencies, and more flexibly numerology. For example, NR Rel-15 supports multiple synchronization signals and physical broadcast channel blocks (SS/PBCH block or SSB) on each carrier frequency range, wherein each SS/PBCH block compromises of four consecutive orthogonal frequency division multiplexing (OFDM) symbols as illustrated in FIG. 8, wherein the first symbol is mapped for primary synchronization signal (PSS), the second and forth symbols are mapped for PBCH, and the third symbol is mapped for both secondary synchronization signal (SSS) and PBCH.

The same SS/PBCH block composition is applied to all supported carrier frequency ranges in NR, which spans from 0 GHz to 52.6 GHz. The transmission bandwidth of PSS and SSS (e.g., 12 resource blocks (RBs)) is smaller than the transmission bandwidth of the whole SS/PBCH block (e.g., 20 RBs). In every RB mapped for PBCH, 3 out of the 12 resource elements (REs) are mapped for the demodulation reference signal (DMRS) of PBCH, wherein the 3 REs are uniformly distributed in the PRB and the starting location of the first RE is based on cell identity (ID).

Moreover, NR Rel-15 supports one or two subcarrier spacings (SCSs) for an SS/PBCH block, for a given band, wherein the same SCS is utilized for PSS, SSS, and PBCH (including DMRS). For carrier frequency range 0 GHz to 6 GHz, 15 kHz and/or 30 kHz can be utilized for the SCS of SS/PBCH block. For carrier frequency range 6 GHz to 52.6 GHz, 120 kHz and/or 240 kHz can be utilized for the SCS of the SS/PBCH block.

The sequence constructing PSS is based on M-sequence with cyclic shifts to represent the cell ID information carried by PSS, and the sequence constructing SSS is based on Gold-sequence (exclusive or of two M-sequences), wherein each M-sequence constructing the Gold-sequence performs cyclic shift to represent the cell ID information carried by SSS.

Figure 9:
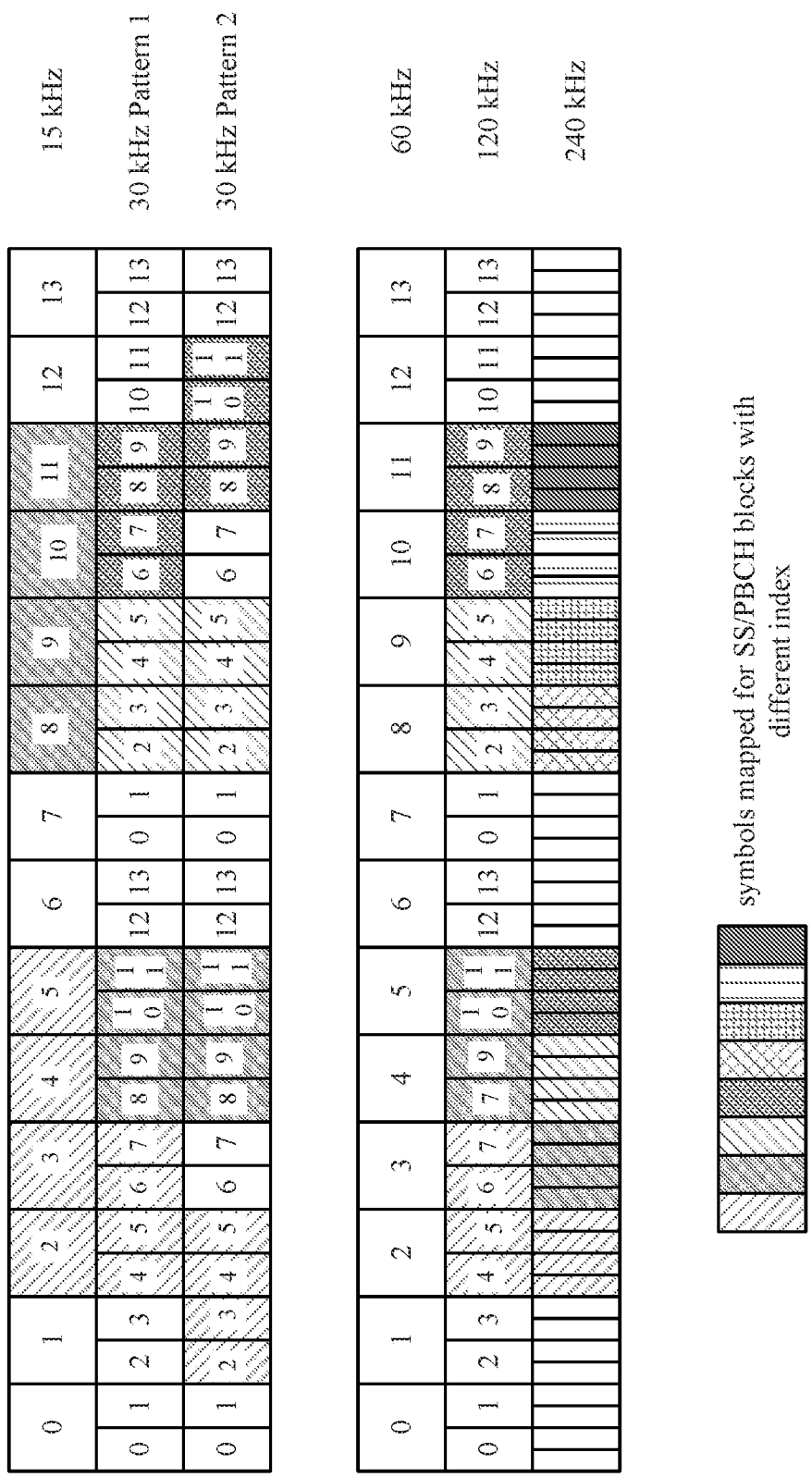
FIG. 9 illustrates an example NR SS/PBCH block pattern in time domain according to embodiments of the present disclosure.

FIG. 9 illustrates an example NR SS/PBCH block pattern in time domain 900 according to embodiments of the present disclosure. An embodiment of the NR SS/PBCH block pattern in time domain 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

In NR Rel-15, SS/PBCH blocks could be transmitted in a beam-sweeping way up to network implementation, and multiple candidate location for transmitting SS/PBCH blocks are predefined within a unit of half frame. The mapping pattern of SS/PBCH blocks to 1 slot with respect to 15 kHz as the reference SCS for frequency range 1 (FR1) from 410 MHz to 7.125 GHz and with respect to 60 kHz as the reference SCS for frequency range 2 (FR2) from 24.25 GHz to 52.6 GHz are illustrated in FIG. 9.

Two mapping patterns are designed for 30 kHz SCS of the SS/PBCH block: Pattern 1 is utilized for non-LTE-NR coexistence bands; and Pattern 2 is utilized for LTE-NR coexistence bands.

Figure 10:
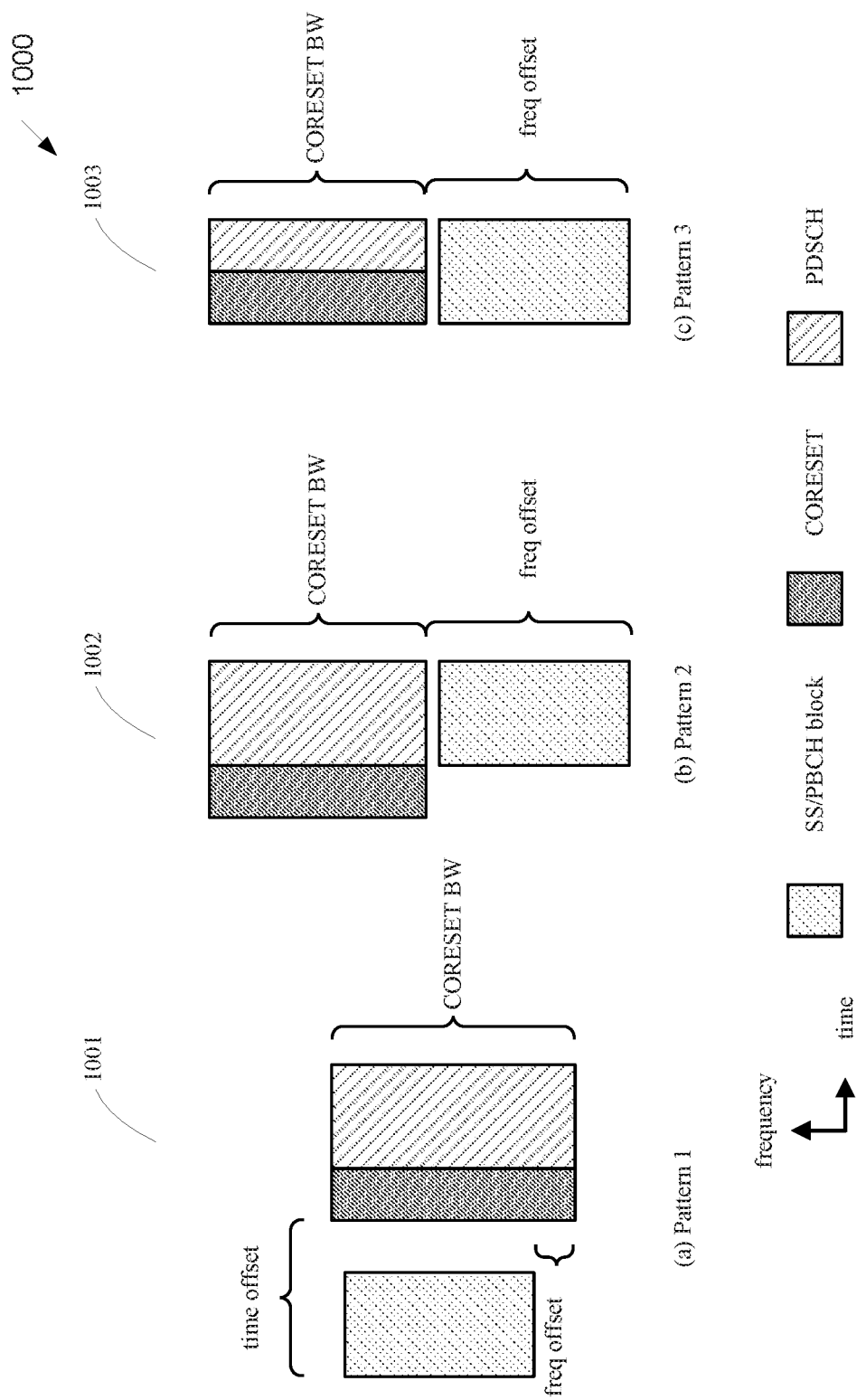
FIG. 10 illustrates an example NR multiplexing pattern of SS/PBCH block and CORESET #0 according to embodiments of the present disclosure.

FIG. 10 illustrates an example NR multiplexing pattern 1000 of SS/PBCH block and CORESET #0 according to embodiments of the present disclosure. An embodiment of the NR multiplexing pattern 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

FIG. 10 illustrates NR Rel-15 multiplexing pattern of SS/PBCH block and CORESET #0.

PBCH is used to deliver MIB to UEs within the serving cell. MIB indicates a configuration of a control resource set (CORESET) #0 and corresponding search space set for scheduling transmission of RMSI, paging, and PRACH configuration. A PRB-level offset between synchronization signal (SS)/PBCH block and CORESET #0 is jointly coded with multiplexing pattern, CORESET #0 bandwidth (BW), and the number of OFDM symbols of the CORESET #0 using 4 bits of MIB, and the parameters for monitor window of common search space in the CORESET #0 are also jointly coded using another 4 bits of MIB. An illustration of the three supported multiplexing patterns of SS/PBCH block and CORESET/PDSCH are illustrated in 1001, 1002, and 1003 of FIG. 10, respectively.

An NR system is intended to support multiple traffic types, including eMBB, eURLLC and mMTC. Unlike eMBB or eURLLC for high-end UEs, mMTC based services are mainly for mid-tier or low-tier UEs with reduced cost, such as reduced TX/RX antennas, reduced operation BW. However, current NR Rel-15 initial access procedure, such as RMSI reception, does not take into account the requirements or needs of low cost UEs. Therefore, many issues regarding UE procedure about RMSI reception for low cost UEs need to be further considered.

One issue is the reduced BW of low cost UEs. For initial access, the minimum UE operation BW should be at least the maximum bandwidth of CORESET #0. For NR Rel-15 in REF 3, the maximum BW of CORESET #0 is about 17 MHz for FR1, i.e., 96 RBs for PDCCH SCS of 15 KHz, 48 RBs for PDCCH SCS of 30 KHz, while about 70 MHz for FR2, i.e., 96 RBs for PDCCH SCS of 60 KHz, 48 RBs for PDCCH SCS of 120 KHz. For mid-tier or low-tier UEs, UE operation BW can be limited, for example 5 MHz at FR1 for services, such as wearable devices, which require data rate less than 30 Mbps, for another example, 50 MHz at FR2 for services, such as HD cameras. To avoid sacrifice the flexibility on configuration of CORESET #0 for legacy UEs and PDCCH blocking, additional or another configuration for CORESET #0 or Type0-PDCCH CSS set can be dedicated for low cost UEs.

Another issue is multiplexing of low cost UEs and legacy UEs with different system information. The broadcasted system information, such as SIB1, for low cost UEs is likely to be different than legacy UEs. For example, separate configuration for new features, such as extended DRX operation, dedicated PRACH resources, are needed to be broadcasted to the new category of UEs.

Another issue is PDCCH capacity in initial BWP considering massive connectivity. Some applications, such as industrial sensor wireless network (ISWN), require UE density of 100-1000 per gateway or 0.05~1 per $m^{-2}$. In this case, PDCCH capacity for scheduling UE-specific transmission/reception, such as msg3 and msg4, may be limited. Therefore, solutions to avoid PDCCH blocking in initial BWP during initial access stage are needed.

Another issue is the overhead on PDCCH monitoring when repetition is needed for coverage recovery due to reduced number of antennas or coverage enhancement in general. It is beneficial for a UE to skip PDCCH monitoring and get the grant information of RMSI directly from other physical layer signal/channel, such as PBCH, when the UE expects to decode PDCCH with repetitions for coverage enhancement or recovery.

The general goal for the solutions in this disclosure is to support coexistence of a new category of UEs and the legacy UE for initial access with backward compatibility.

Therefore, there is need to determine DCI for scheduling PDSCH associated with system information transmission from a serving cell to the new category of UEs.

There is another need to determine a dedicated Type0-PDCCH CSS set for PDCCH monitoring by the new category of UEs.

There is yet another need to determine dedicated CORESET #0 for PDCCH monitoring by the new category of UEs.

There is yet another need to determine the grant for RMSI reception without PDCCH monitoring for a UE operates with reduced cost, such as reduced operation BW, number of antennas, and low power consumption.

The present disclosure relates to a pre-5th-Generation (5G) or 5G communication system to be provided for supporting higher data rates Beyond 4th-Generation (4G) communication system such as long term evolution (LTE). The disclosure relates to determining DCI for scheduling PDSCH associated with system information transmission from a serving cell to a new category of UEs. The disclosure further relates to determining a configuration of dedicated Type0-PDCCH CSS set for PDCCH monitoring by the new category of UEs. The disclosure additionally relates to determining a configuration of dedicated CORESET #0 for PDCCH monitoring by the new category of UEs. The disclosure also relates to determining a grant of PDSCH without PDCCH monitoring for the transmission of RMSI to the new category of UEs operates with reduced cost, such as reduced operation BW, number of antennas, and low power consumption.

In one embodiment, determination of DCI is provided for scheduling PDSCH associated with SIB-light transmission from a serving cell to Cat-L UEs. Cat-L UEs can coexist with legacy UEs supported in NR Rel-15 or Rel-16 in the serving cell.

In one example for determination of DCI for scheduling a PDSCH associated with SIB-light reception, a Cat-L UE monitors PDCCH candidates in one or more applicable CSS set(s) wherein the legacy UEs monitor DCI format with CRC scrambled by SI-RNTI, but for DCI format with CRC scrambled by a new RNTI other than SI-RNTI. For the new RNTI, the new RNTI can be either fixed in length of 16 bits, for example, 65534 (0xFFFE), or determined based on an indication carried in PBCH. For simplicity of expression, the new RNTI is referred as L-SI-RNTI in this disclosure.

For the applicable CSS set, a Cat-L UE monitors PDCCH candidates in any of the following search space sets: a Type0-PDCCH CSS set configured by pdcch-ConfigSIB1 inMIB or by searchSpaceSIB1 in PDCCH-ConfigCommon or by searchSpaceZero in PDCCH-ConfigCommon for a DCI format with CRC scrambled by a L-SI-RNTI on the primary cell of the MCG; and a TypeA-PDCCH CSS set configured by searchSpaceOtherSystemInformation in PDCCH-ConfigCommon for a DCI format with CRC scrambled by L-SI-RNTI on the primary cell of the MCG.

Figure 11:
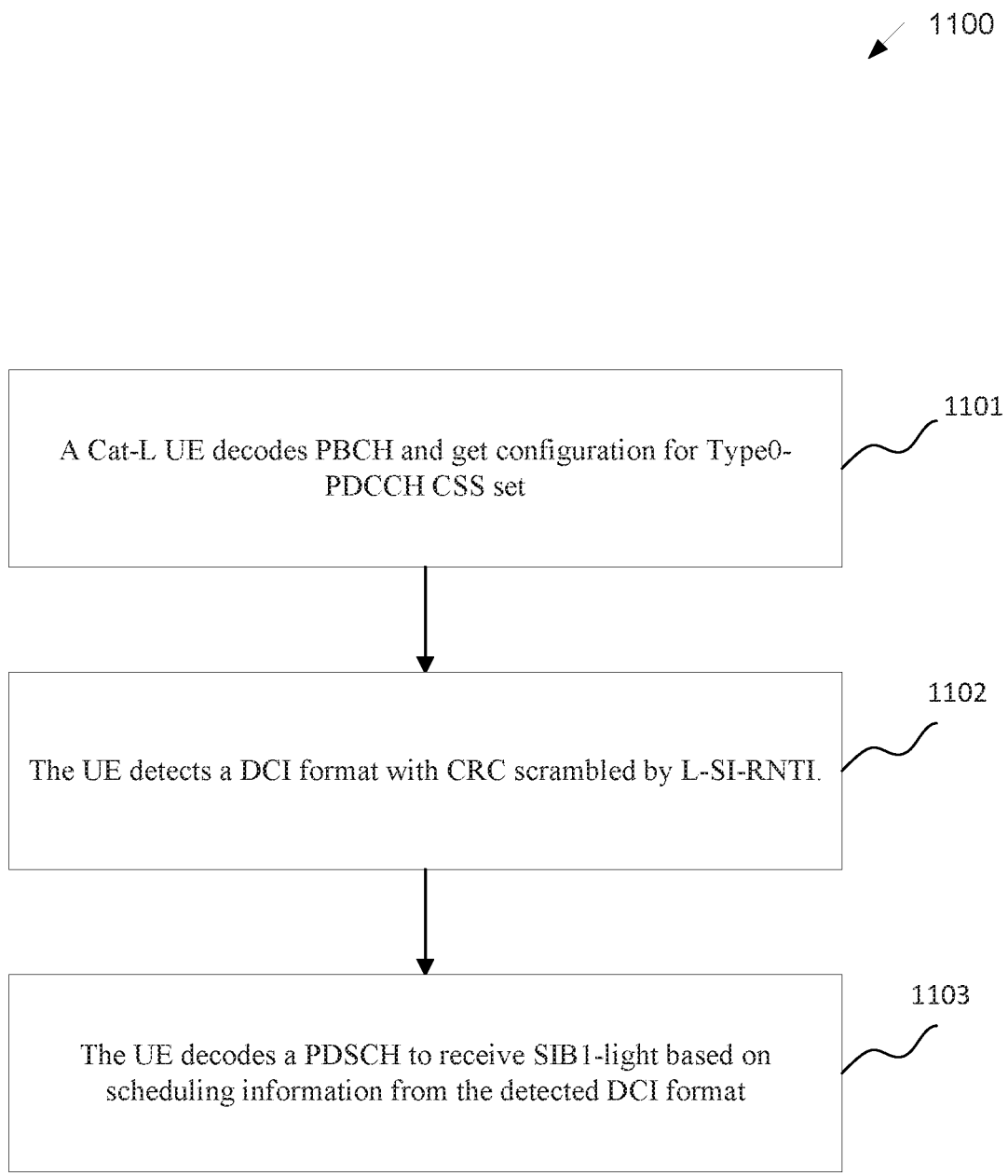
FIG. 11 illustrates a flow chart of a method for Cat-L UE procedure according to embodiments of the present disclosure.

FIG. 11 illustrates a flow chart of a method 1100 for Cat-L UE procedure according to embodiments of the present disclosure. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

FIG. 11 illustrates an example of Cat-L UE procedure for the reception of SIB-light.

As illustrated in FIG. 11, a Cat-L UE decodes PBCH to get a configuration on Type0-PDCCH CSS set, in 1101, The UE then monitors PDCCH candidates in Type0-PDCCH CSS set and successfully decodes a DCI format with CRC scrambled by L-SI-RNTI, in 1102. The UE then decodes a PDSCH based on the scheduling information indicated by the received DCI to get SIB1 or RMSI dedicated to Cat-L UEs, in 1103.

For the information transmitted by means of the DCI format with CRC scrambled by L-SI-RNTI, in one example, the information is same as the information transmitted by means of the DCI format 1_0 with CRC scrambled by SI-RNTI.

In another example for determination of DCI for scheduling a PDSCH associated with SIB-light reception, a Cat-L UE monitors PDCCH candidates in an applicable CSS set wherein the legacy UEs monitor DCI format 1_0 with CRC scrambled by SI-RNTI, but for another DCI format other than DCI format 1_0 with CRC scrambled by SI-RNTI. In this case, the Cat-L UEs monitors PDCCH in the same Type0-PDCCH CSS set and CORESET #0 as legacy UEs based on the configuration information indicated by PBCH. In one example for determining the DCI format monitored by Cat-L UE in Type0-PDCCH CSS set, the DCI format is a new DCI format other than any of the existing DCI formats defined in NR specification. The DCI format with CRC scrambled by SI-RNTI monitored by Cat-L UEs includes scheduling information for a PDSCH dedicated to Cat-L UEs, and legacy UEs are not required to monitor the DCI format.

For the applicable CSS set, a Cat-L UE monitors PDCCH candidates in any of the following search space sets.

In one example for determination of DCI for scheduling a PDSCH associated with SIB-light reception, a Cat-L UE monitors PDCCH candidates in one or more applicable CSS set(s) for DCI format with CRC scrambled by SI-RNTI. The applicable CSS set(s) can be any CSS set where legacy UEs monitor DCI format with CRC scrambled by SI-RNTI. For the DCI format with CRC scrambled by SI-RNTI, a Cat-L UE assumes different interpretation of the information transmitted by the DCI format than legacy UEs.

For the applicable CSS set, a Cat-L UE can monitor PDCCH candidates in any of the following: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG; and a Type0A-PDCCH CSS set configured by searchSpaceOtherSystemInformation in PDCCH-ConfigCommon for a DCI format with CRC scrambled by a SI-RNTI on the primary cell of the MCG.

For a respective DCI format with CRC scrambled by SI-RNTI in an applicable CSS set from a serving cell, the DCI format can schedule not only a PDSCH for the transmission of SIB from the serving cell to legacy UEs, but also another PDSCH for the transmission of SIB-light from the serving cell to Cat-L UEs.

A Cat-L UE can determine whether or not a PDSCH for SIB-light reception is scheduled by a respective DCI format, for example DCI format 10, with CRC scrambled by SI-RNTI from an applicable CSS set through any of the following methods.

In one example, a field in the respective DCI format indicates whether or not another or second PDSCH, other than the PDSCH associated with SIB reception to legacy UEs, is scheduled by the DCI format for the reception for SIB-light broadcasted to Cat-L UEs.

In one sub-example, the field can be 1 bit. A Cat-L UE assumes the DCI format only schedules a PDSCH broadcasted to legacy UEs as defined in NR Rel-15/16 when the value of the field is "0." A Cat-L UE assumes the DCI format schedules a PDSCH associated with SIB-light reception dedicated to Cat-L UEs when the value of the field is "1."

In another sub-example, the field can be 1 bit. A Cat-L UE assumes the DCI format only schedules a PDSCH broadcasted to legacy UEs as defined in NR Rel-15/16 when the value of the field is "1." A Cat-L UE assumes the DCI format schedules a PDSCH associated with SIB-light reception dedicated to Cat-L UEs when the value of the field is "0."

In another example, the Cat-L UE is indicated by an indication carried in PBCH whether or not another or second PDSCH, other than the PDSCH associated with SIB reception to legacy UEs, is scheduled by the DCI format for the reception for SIB-light broadcasted to Cat-L UEs.

In yet another example, the Cat-L UE always assume that the respective DCI format schedules another or second PDSCH, other than the PDSCH associated with SIB reception to legacy UEs, for the reception for SIB-light broadcasted to Cat-L UEs.

Figure 12:
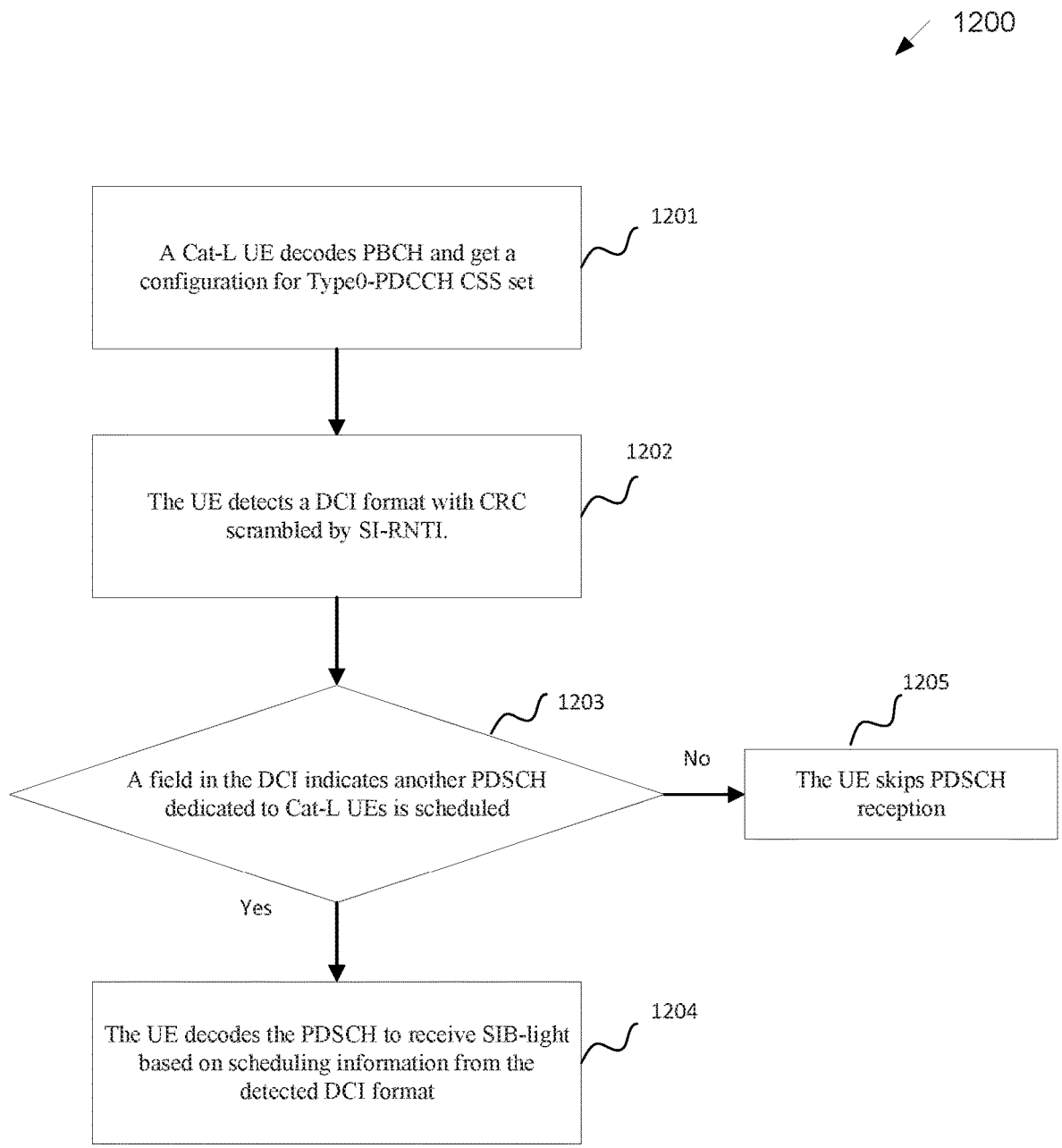
FIG. 12 illustrates another flow chart of a method for Cat-L UE procedure according to embodiments of the present disclosure.

FIG. 12 illustrates another flow chart of a method 1200 for Cat-L UE procedure according to embodiments of the present disclosure. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

FIG. 12 illustrates an example of Cat-L UE procedure for the reception of SIB-light.

As illustrated in FIG. 12, a Cat-L UE decodes PBCH to get a configuration on Type0-PDCCH CSS set, in step 1201. The UE then monitors PDCCH candidates in Type0-PDCCH CSS set and successfully decodes a DCI format with CRC scrambled by SI-RNTI, in step 1202. The UE then determines whether or not another PDSCH, other than the PDSCH broadcasted to legacy UEs, is scheduled by the DCI for SIB-light reception broadcasted or dedicated to Cat-L UEs based on a field in the decoded DCI, in step 1203. If the field indicates another or second PDSCH is transmitted, the UE decodes the second PDSCH for the reception of SIB-light dedicated to Cat-L UEs based on the scheduling information indicated by received DCI in step 1204. Otherwise, the UE skip PDSCH reception in step 1205.

Figure 13:
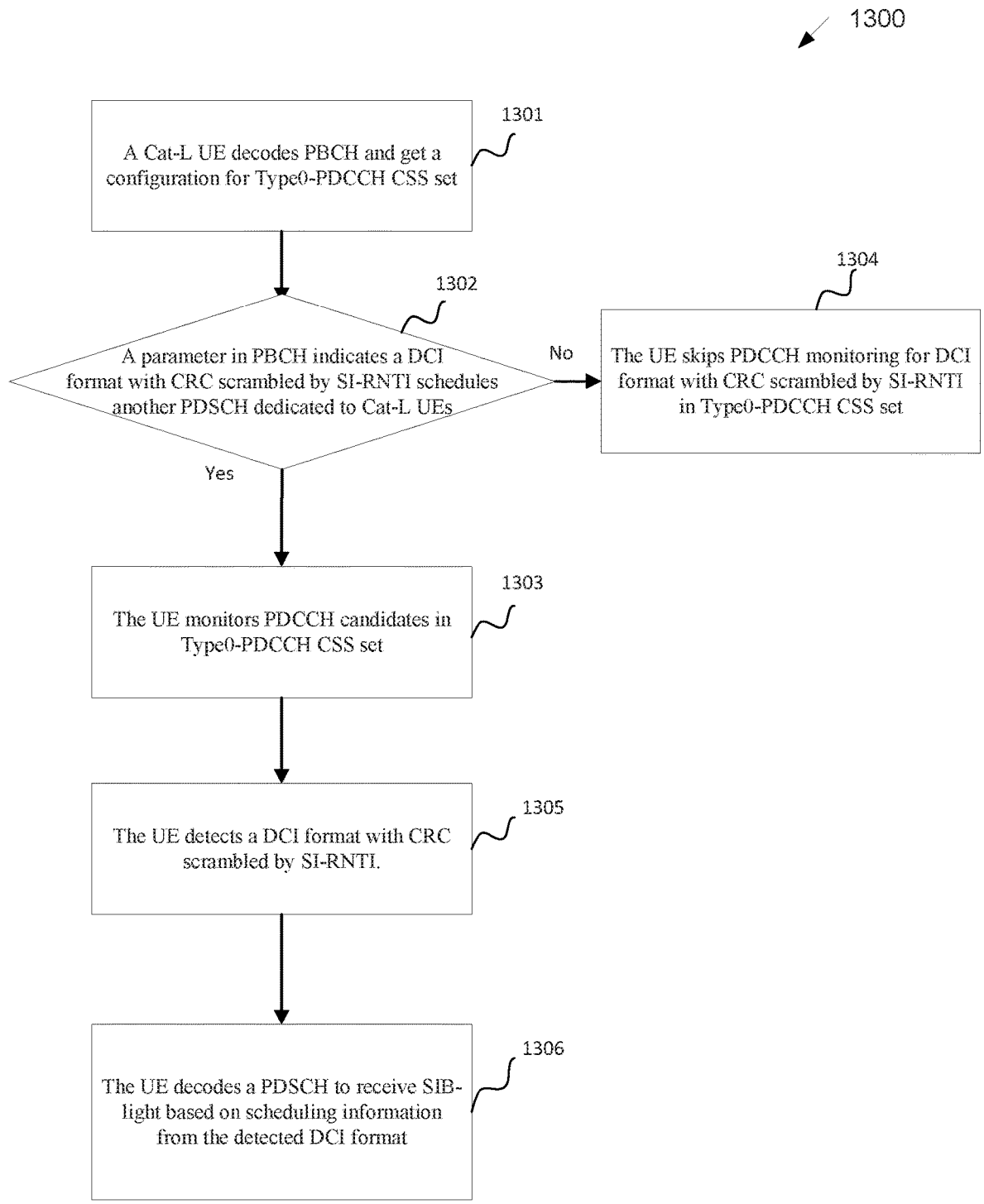
FIG. 13 illustrates yet another flow chart of a method for Cat-L UE procedure according to embodiments of the present disclosure.

FIG. 13 illustrates yet another flow chart of a method 1300 for Cat-L UE procedure according to embodiments of the present disclosure. An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

FIG. 13 illustrates another example of Cat-L UE procedure for the reception of SIB-light.

As illustrated in FIG. 13, a Cat-L UE decodes PBCH with a configuration on Type0-PDCCH CSS set, in step 1301. The UE then determines whether or not DCI format with CRC scrambled by SI-RNTI from Type0-PDCCH CSS set is used to schedule another or second PDSCH, other than the PDSCH broadcasted to legacy UEs, for SIB-light reception broadcasted or dedicated to Cat-L UEs based on an indication in PBCH, in step 1302. If the PBCH indicates a DCI format with CRC scrambled by SI-RNTI from Type0-PDCCH CSS set schedules the second PDSCH, the Cat-L UE then monitors PDCCH candidates in Type0-PDCCH CSS set for DCI format with CRC scrambled by SI-RNTI, in step 1303; otherwise the Cat-L UE skips monitoring PDCCH candidates with CRC scrambled by SI-RNTI in the Type0-PDCCH CSS set, in step 1304. When the Cat-L UE successfully decodes a DCI format with CRC scrambled by SI-RNTI from the Type0-PDCCH CSS set, in step 1305, the UE then decodes a PDSCH for the reception of SIB-light dedicated to Cat-L UEs based on the scheduling information transmitted by the means of the received DCI format, in step 1306.

When a DCI format with CRC scrambled by SI-RNTI is used to schedule both a PDSCH for SIB broadcasted to legacy UEs and another/second PDSCH for SIB-light broadcasted to Cat-L UEs, a Cat-L UE can determine scheduling information for the second PDSCH through any of the following methods.

In one example for determination of the frequency domain resource allocation, the DCI format has a frequency domain resource assignment field, and the field is used for both the first and the second PDSCH. In another example, the DCI format has two frequency domain resource assignment fields, such that one is for PDSCH associated with legacy SIB reception, and the other is for the PDSCH associated with SIB-light reception. The second frequency domain resource assignment field indicates resource indication value (RIV) for downlink resource allocation type 1 for the PDSCH associated with SIB-light reception. The second frequency domain resource assignment field can be in length of in length of $\lceil \log_2(N_{RB}^{DL,BWP} (N_{RB}^{DL,BWP}+1)/2) \rceil$ bits, where $N_{RB}^{DL,BWP}$ is the size of min(Nmax_RB, N^CORESET0_RB), and such that Nmax_RB is the maximum operation bandwidth of Cat-L UEs, and N^CORESET0_RB is the size of CORESET0.

For determination of the time domain resource allocation, in one example, the DCI format has two time domain resource assignment fields, such that one is for PDSCH associated with legacy SIB reception, and the other is for PDSCH associated with SIB-light reception. In another example, the DCI format has one-time domain resource assignment field, and the field is used for both the PDSCH dedicated/broadcasted to legacy UEs and the second PDSCH dedicated/broadcasted to Cat-L UEs.

In one sub-example, the Cat-L UE assumes the time domain resource assignment field indicate the row index to a different default PDSCH time domain resource allocation table other than the default table used by legacy UEs, when apply the time domain resource assignment field to determine the time domain resource allocation for the PDSCH associated with SIB-light reception. TABLE 1 is an example of the default second PDSCH time domain resource allocation table for normal CP when considering SS/PBCH block and CORESET multiplexing pattern 1.

TABLE 2 is an example of the default second PDSCH time domain resource allocation table for extended CP when considering SS/PBCH block and CORESET multiplexing pattern 1.

TABLE 3 is an example of the default second PDSCH time domain resource allocation table when considering SS/PBCH block and CORESET multiplexing pattern 2.

TABLE 4 is an example of the default second PDSCH time domain resource allocation table when considering SS/PBCH block and CORESET multiplexing pattern 3.

In another sub-example, the Cat-L UE assume the starting symbol and duration of PDSCH for the PDSCH associated with SIB-light are same as the PDSCH associated with legacy SIB reception as indicated by the time domain resource assignment field in the DCI format. However, for determination of slot offset, K0', between the PDSCH associated with SIB-light reception and the DCI format, the Cat-L UE assumes K0'=K0+D0, where K0 is the slot offset between the PDSCH associated with legacy SIB reception and the DCI format, and D0 is an time offset, in terms of number of OFDM symbols or slots. For determination of D0, in one example, D0 can either be indicated by a field in the DCI format. In another example, D0 can be indicated by PBCH. In yet another example, D0 can be fixed and defined in the specification of system operation, for example, D0=1.

For VRB-to-PRB mapping, in one example, one VRB-to-PRB mapping field can be used for both the PDSCH dedicated/broadcasted to legacy UEs and the second PDSCH dedicated/broadcasted to Cat-L UEs. In another example, another/second VRB-to-PRB mapping can be carried in the DCI format, and the Cat-L UE interprets the second VRB-to-PRB mapping field for the second PDSCH reception.

For modulation and coding scheme, in one example, one Modulation and coding scheme field can be used for both the PDSCH dedicated/broadcasted to legacy UEs and the second PDSCH dedicated/broadcasted to Cat-L UEs. In another example, another/second modulation and coding scheme field can be carried in the DCI format, and the Cat-L UE interprets the second modulation and coding scheme field for the second PDSCH reception.

For TB scaling, in one example, one TB scaling field can be used for both the PDSCH dedicated/broadcasted to legacy UEs and the second PDSCH dedicated/broadcasted to Cat-L UEs. In another example, another/second TB scaling field can be carried in the DCI format, and the Cat-L UE interprets the second TB scaling field for the second PDSCH reception.

TABLE 1

Default second PDSCH time domain resource allocation A for normal CP

| Row index | dmrs-TypeA-Position | PDSCH mapping type | $K_0$ | S | L |
|---|---|---|---|---|---|
| 1 | 2 | Type A | 1 | 2 | 12 |
|   | 3 | Type A | 1 | 3 | 11 |
| 2 | 2 | Type A | 1 | 2 | 10 |
|   | 3 | Type A | 1 | 3 | 9 |
| 3 | 2 | Type A | 1 | 2 | 9 |
|   | 3 | Type A | 1 | 3 | 8 |
| 4 | 2 | Type A | 1 | 2 | 7 |
|   | 3 | Type A | 1 | 3 | 6 |
| 5 | 2 | Type B | 0 | 7 | 5 |
|   | 3 | Type B | 0 | 7 | 4 |
| 6 | 2 | Type A | 0 | 2 | 7 |
|   | 3 | Type A | 0 | 3 | 7 |
| 7 | 2 | Type B | 0 | 8 | 4 |
|   | 3 | Type B | 0 | 10 | 4 |
| 8 | 2, 3 | Type B | 0 | 5 | 7 |
| 9 | 2, 3 | Type B | 0 | 7 | 2 |
| 10 | 2, 3 | Type B | 0 | 11 | 2 |
| 11 | 2, 3 | Type B | 0 | 12 | 2 |
| 12 | 2, 3 | Type A | 1 | 1 | 13 |
| 13 | 2, 3 | Type B | 0 | 7 | 5 |
| 14 | 2, 3 | Type B | 0 | 6 | 5 |
| 15 | 2, 3 | Type B | 1 | 4 | 7 |
| 16 | 2, 3 | Type B | 0 | 4 | 4 |

Figure 14:
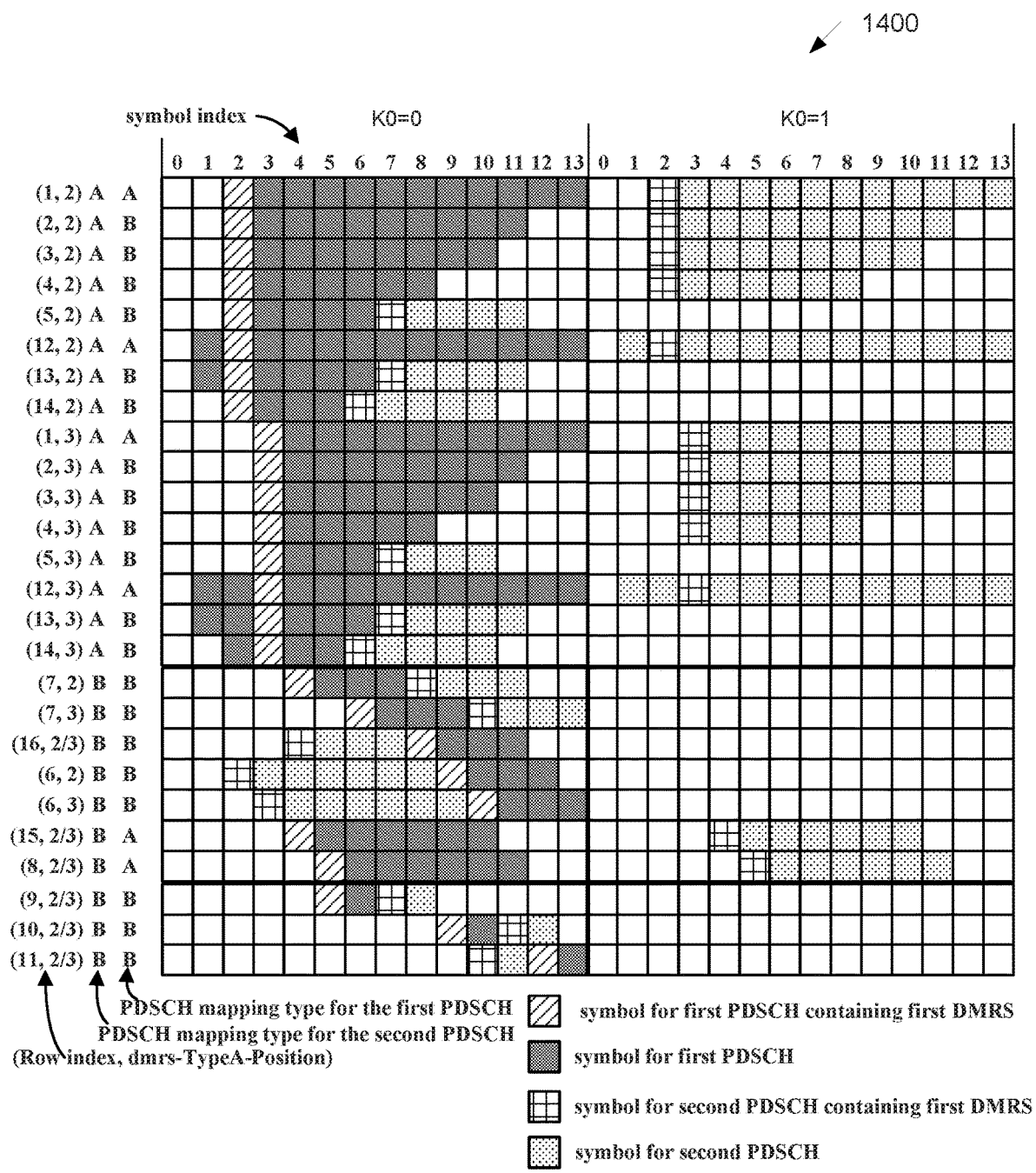
FIG. 14 illustrates an example time domain resource allocation for two PDSCHs according to embodiments of the present disclosure.

FIG. 14 illustrates an example time domain resource allocation for two PDSCHs 1400 according to embodiments of the present disclosure. An embodiment of the time domain resource allocation for two PDSCHs 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

FIG. 14 illustrates an example of time domain resource allocation for two PDSCHs determined by a single time domain resource assignment field. The time domain resource assignment field carries the row index to the default PDSCH time domain resource allocation tables, where the default first PDSCH time domain resource allocation table is determined in NR standard specification, and the default second PDSCH time domain resource allocation table is TABLE 1 above.

TABLE 2

Default second PDSCH time domain resource allocation A for extended CP

| Row index | dmrs-TypeA-Position | PDSCH mapping type | $K_0$ | S | L |
|---|---|---|---|---|---|
| 1 | 2 | Type A | 1 | 2 | 6 |
|   | 3 | Type A | 1 | 3 | 5 |
| 2 | 2 | Type A | 1 | 2 | 10 |
|   | 3 | Type A | 1 | 3 | 9 |

TABLE 2-continued

Default second PDSCH time domain resource allocation A for extended CP

| Row index | dmrs-TypeA-Position | PDSCH mapping type | $K_0$ | S | L |
|---|---|---|---|---|---|
| 3 | 2 | Type A | 1 | 2 | 9 |
|   | 3 | Type A | 1 | 3 | 8 |
| 4 | 2 | Type A | 1 | 2 | 7 |
|   | 3 | Type A | 1 | 3 | 6 |
| 5 | 2 | Type B | 0 | 7 | 5 |
|   | 3 | Type B | 0 | 7 | 4 |
| 6 | 2 | Type B | 1 | 6 | 4 |
|   | 3 | Type B | 0 | 10 | 2 |
| 7 | 2 | Type B | 0 | 8 | 4 |
|   | 3 | Type B | 1 | 6 | 4 |
| 8 | 2, 3 | Type B | 1 | 5 | 6 |
| 9 | 2, 3 | Type B | 0 | 7 | 2 |
| 10 | 2, 3 | Type B | 0 | 7 | 2 |
| 11 | 2, 3 | Type B | 0 | 8 | 2 |
| 12 | 2, 3 | Type A | 1 | 1 | 11 |
| 13 | 2, 3 | Type A | 1 | 1 | 6 |
| 14 | 2, 3 | Type B | 0 | 6 | 4 |
| 15 | 2, 3 | Type B | 1 | 4 | 6 |
| 16 | 2, 3 | Type B | 1 | 8 | 4 |

TABLE 3

Default second PDSCH time domain resource allocation B

| Row index | dmrs-TypeA-Position | PDSCH mapping type | $K_0$ | S | L |
|---|---|---|---|---|---|
| 1 | 2, 3 | Type B | 0 | 4 | 2 |
| 2 | 2, 3 | Type B | 0 | 6 | 2 |
| 3 | 2, 3 | Type B | 0 | 8 | 2 |
| 4 | 2, 3 | Type B | 0 | 10 | 2 |
| 5 | 2, 3 | Type B | 0 | 12 | 2 |
| 6 | 2, 3 | Type B | 1 | 4 | 2 |
| 7 | 2, 3 | Type B | 1 | 6 | 2 |
| 8 | 2, 3 | Type B | 0 | 6 | 4 |
| 9 | 2, 3 | Type B | 0 | 8 | 4 |
| 10 | 2, 3 | Type B | 0 | 10 | 4 |
| 11 | 2, 3 | Type B | 1 | 8 | 4 |
| 12 (Note 1) | 2, 3 | Type B | 1 | 10 | 4 |
| 13 (Note 1) | 2, 3 | Type B | 1 | 2 | 7 |
| 14 (Note 1) | 2 | Type A | 1 | 2 | 12 |
|   | 3 | Type A | 1 | 3 | 11 |
| 15 | 2, 3 | Type B | 1 | 6 | 4 |
| 16 |  | Reserved |  |  |  |

(Note 1):
If the PDSCH was scheduled with SI-RNTI in PDCCH Type0 common search space, the UE may assume that this PDSCH resource allocation is not applied

TABLE 4

Default second PDSCH time domain resource allocation C

| Row index | dmrs-TypeA-Position | PDSCH mapping type | $K_0$ | S | L |
|---|---|---|---|---|---|
| 1 (Note 1) | 2, 3 | Type B | 0 | 4 | 2 |
| 2 | 2, 3 | Type B | 0 | 6 | 2 |
| 3 | 2, 3 | Type B | 0 | 8 | 2 |
| 4 | 2, 3 | Type B | 0 | 10 | 2 |
| 5 | 2, 3 | Type B | 0 | 12 | 2 |
| 6 |  | Reserved |  |  |  |
| 7 |  | Reserved |  |  |  |
| 8 | 2, 3 | Type B | 0 | 6 | 4 |
| 9 | 2, 3 | Type B | 0 | 8 | 4 |
| 10 | 2, 3 | Type B | 0 | 10 | 4 |
| 11 | 2, 3 | Type B | 1 | 8 | 4 |
| 12 | 2, 3 | Type B | 1 | 10 | 4 |

TABLE 4-continued

Default second PDSCH time domain resource allocation C

| Row index | dmrs-TypeA-Position | PDSCH mapping type | $K_0$ | S | L |
|---|---|---|---|---|---|
| 13 (Note 1) | 2, 3 | Type B | 1 | 2 | 7 |
| 14 (Note 1) | 2 | Type A | 1 | 2 | 12 |
|  | 3 | Type A | 1 | 3 | 11 |
| 15 (Note 1) | 2, 3 | Type B | 0 | 6 | 6 |
| 16 (Note 1) | 2, 3 | Type B | 0 | 8 | 6 |

(Note 1):
The UE may assume that this PDSCH resource allocation is not used, if the PDSCH was scheduled with SI-RNTI in PDCCH Type0 common search space For the DMRS of the second PDSCH associated with SIB-light transmission to Cat-L UEs, a Cat-L UE may assume no DMRS is transmitted in channel resources allocated for the second PDSCH and uses the DMRS from the first PDSCH for decoding the second PDSCH.

In one example, the Cat-L UE assumes no DMRS for the second PDSCH when the second PDSCH is scheduled in the same slot as the first PDSCH associated with SIB transmission to legacy UEs.

In another example, a field in the DCI format scheduling the two PDSCHs indicates whether or not a DMRS in the second PDSCH is transmitted or not.

In one embodiment, determination of a Type0-PDCCH CSS set is provided for PDCCH candidates monitoring by Cat-L UEs with configuration provided to Cat-L UEs before RMSI reception. For the simplicity of expression, the Type0-PDCCH CSS set dedicated to Cat-L UEs is referred as CSS0-light in this disclosure.

In one example for determining configuration of CSS0-light, the configuration includes a binary bit, to indicate whether or not CSS0-light is transmitted from the serving cell to Cat-L UEs. If CSS0-light is not transmitted, a Cat-L UE monitors PDCCH candidates in Type0-PDCCH CSS set configured by searchSpaceZero in pdcch-ConfigSIB1 for scheduling system information. Otherwise, the Cat-L UE monitors CSS0-light for PDCCH candidates and does not monitor any PDCCH candidate in legacy Type0-PDCCH CSS set configured by searchSpaceZero in pdcch-ConfigSIB1. In one example, the binary bit can be carried by a physical layer signal/channel, for example, PBCH.

A Cat-L UE monitors PDCCH candidates in CSS0-light set for any of the following DCI format: a DCI format with CRC scrambled by SI-RNTI on the primary cell of the MCG; a DCI format with CRC scrambled by a RA-RNTI or a TC-RNTI on the primary cell; and a DCI format with CRC scrambled by a P-RNTI on the primary cell of the MCG.

Similarly, as Type0-PDCCH CSS set, a Cat-L UE determines PDCCH monitoring occasion(s) per SS/PBCH block with index i. The Cat-L UE assumes demodulation-reference signal (DM-RS) of PDCCH reception in the CSS0-light is QCLed with the associated SS/PBCH block with any of the following QCL Types: "QCL-TypeA:" {Doppler shift, Doppler spread, average delay, delay spread}; "QCL-TypeB:" {Doppler shift, Doppler spread}; "QCL-TypeC:" {Doppler shift, average delay}; and "QCL-TypeD:" {Spatial Rx parameter}.

For the CORESET associated with CSS0-light, the CORESET can either configured by controlResourceSetZero inpdcch-ConfigSIB, or a CORESET dedicated to Cat-L UEs.

In one example for determination of a configuration of CSS0-light, the configuration is derived implicitly from the configuration of Type0-PDCCH CSS set configured by searchSpaceZero in pdcch-ConfigSIB1.

For the SS/PBCH block and CORESET multiplexing pattern 1, a Cat-L UE monitors PDCCH candidates in CSS0-light over X consecutive slots starting from slot, $n'_0$, such that $n'_0 = n_0 + D\_CSS0$, where n0 is the starting slot index for PDCCH monitoring in Type0-PDCCH CSS set associated with a SS/PBCH block with index i, and D_CSS0 is time offset between the start of PDCCH monitoring occasion in CSS0-light and the start of PDCCH monitoring occasion in Type0-PDCCH CSS set associated with same SS/PBCH block. For determination of X, X can be either fixed, for example, X=2 or indicated by PBCH. For determination of D_CSS0, D_CSS0 can be associated with any of the following parameters: M, provided in NR standard specification μ, for PDCCH reception in the CORESET associated with CSS0-light; and $L_{max}$, maximum number of SS/PBCH blocks in the initial BWP.

In one example, the UE assumes that $D = L_{max} \cdot M/2^{\mu}$, when M=1 or 2; In another example, the UE assumes that D=1, when M=2. For determination of the first symbol index for a monitoring occasion, in one example, the UE assumes the first symbol index for a monitoring occasion associated with SS/PBCH block with index i from CSS0-light is same as the first symbol index for a monitoring occasion associated with SS/PBCH block with index i from Type0-PDCCH CSS set.

Figure 15:
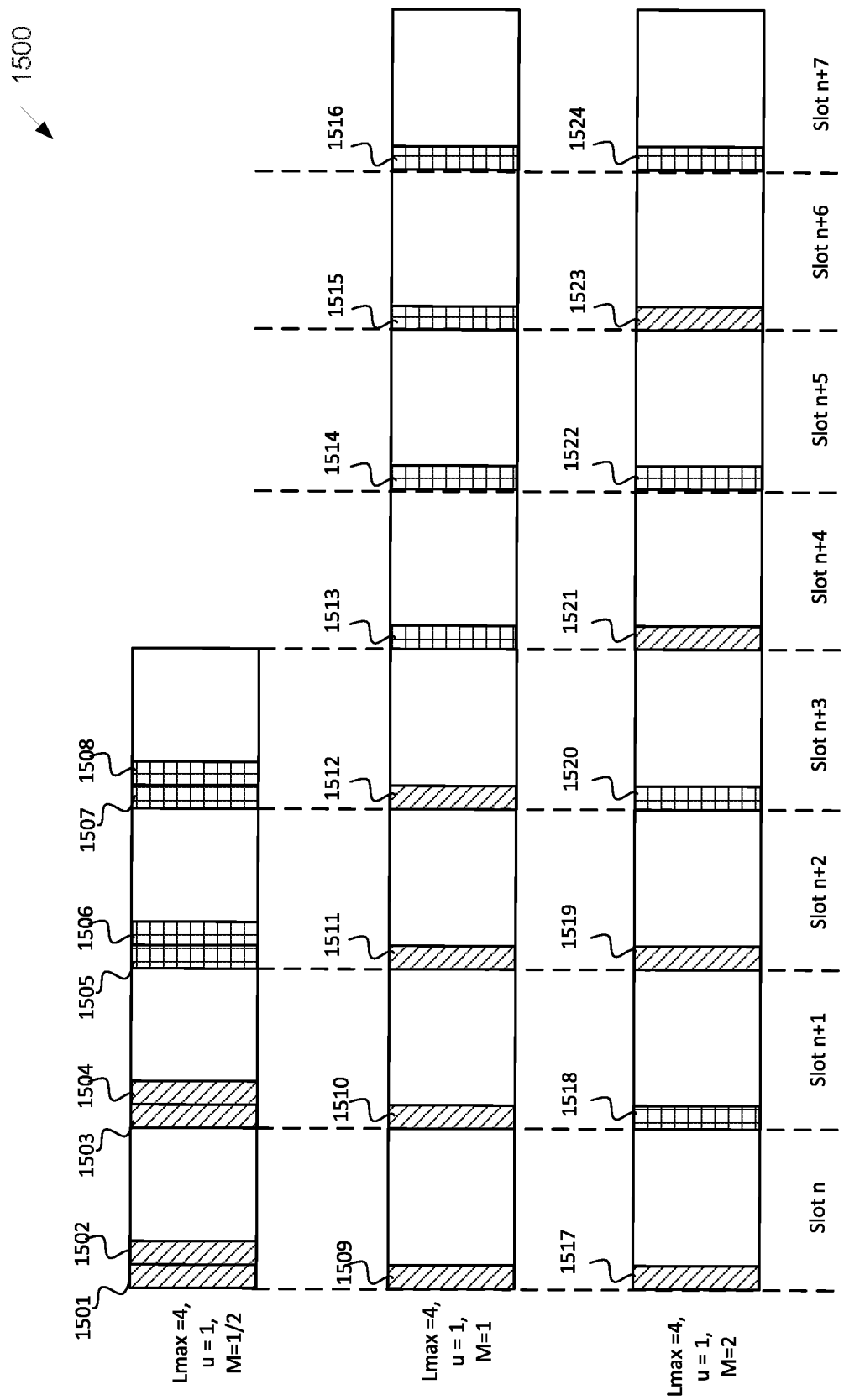
FIG. 15 illustrates an example first monitoring occasion in CSS0-light according to embodiments of the present disclosure.

FIG. 15 illustrates an example first monitoring occasion in CSS0-light 1500 according to embodiments of the present disclosure. An embodiment of the first monitoring occasion in CSS0-light 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

FIG. 15 illustrates an example of first monitoring occasion in CSS0-light when $L_{max}$ =4, p=1 for SS/PBCH block and CORESET multiplexing pattern 1. When M=½, 1501, 1502, 1503, and 1504 are the first monitoring occasion from Type0-PDCCH CSS set associated with SS/PBCH block with index i=0, 1, 2, 3, respectively, while 1505, 1506, 1507, and 1508 are the first monitoring occasion from CSS0-light associated with SS/PBCH block with index=0, 1, 2, 3, respectively. When M=1, 1509, 1510, 1511, and 1512 are the first monitoring occasion from Type0-PDCCH CSS set associated with SS/PBCH block with index i=0, 1, 2, 3, respectively, while 1513, 1514, 1515, and 1516 are the first monitoring occasion from CSS0-light associated with SS/PBCH block with index=0, 1, 2, 3, respectively. When M=2, 1517, 1519, 1521, and 1523 are the first monitoring occasion from Type0-PDCCH CSS set associated with SS/PBCH block with index i=0, 1, 2, 3, respectively, while 1518, 1520, 1522, and 1524 are the first monitoring occasion from CSS0-light associated with SS/PBCH block with index=0, 1, 2, 3, respectively.

For the SS/PBCH block and CORESET multiplexing pattern 2 for legacy UEs, a Cat-L UE monitors PDCCH in the CSS0-light over Y slot(s) with CSS0-light periodicity equal to the periodicity of SS/PBCH block. For determination of Y, Y can be either fixed, for example, Y=1 or indicated by PBCH. For a SS/PBCH block with index i, the Cat-L UE determines the first slot index for PDCCH monitoring, i.e., $n'_C$, SFN index, i.e., $SFN'_C$, and the first symbol index within a monitoring occasion through any of the following methods.

In one example, the Cat-L UE assumes searchSpaceZero in pdcch-ConfigSIB1 indicates a row index to a configuration table for determining $n'_C$, $SFN'_C$ and first symbol index within a monitoring occasion dedicated to Cat-L UEs.

In one sub-example, the Cat-L UE assumes TABLE 5 as corresponding configuration table when SCS for SS/PBCH block and PDCCH in CSS0-light are 120 KHz and 120 kHz, respectively.

In another sub-example, the Cat-L UE assumes TABLE 6 as corresponding configuration table when SCS for SS/PBCH block and PDCCH in CSS0-light are 120 KHz and 60 kHz, respectively.

In yet another sub-example, the Cat-L UE assumes TABLE 7 as corresponding configuration table when SCS for SS/PBCH block and PDCCH in CSS0-light are 240 KHz and 240 kHz, respectively.

In yet another sub-example, the Cat-L UE assumes TABLE 8 as corresponding configuration table when SCS for SS/PBCH block and PDCCH in CSS0-light are 240 KHz and 120 kHz, respectively.

In yet another example, the Cat-L UE assumes $n'_C$ and $SFN'_C$ is derived from the slot index $n_C$ and $SFN_C$ for Type0-PDCCH CSS set. In one example, $n'_C = n_C + D2\_CSS0$. $SFN'_C = SFN_C$ Nc if floor($n'_C$/N^frame_slot) mod 2=0 or $SFN'_C = SFN_C + 1$ if floor($n'_C$/N^frame_slot) mod 2=1, where N^frame_slot is the number of slots within a frame, i.e., 10 ms. In one example, $$D2_{CSS0} = \frac{Lmax}{2} \cdot \frac{\mu^{CSS0}}{\mu^{SSB}}$$

where Lmax is the maximum number of SS/PBCH blocks in the initial BWP, $\mu^{SSB}$ and $\mu^{CSS0}$ are SCS configuration for SS/PBCH block and PDCCH in CSS0-light, respectively. For the first symbol index within a monitoring occasion, the first symbol index can be indicated by NR standard specification, which is same as Type0-PDCCH CSS set.

TABLE 5

PDCCH monitoring occasions for CSS0-light - SS/PBCH block and CORESET (associated with Type0-PDCCH CSS set) for multiplexing pattern 2 and {SS/PBCH block, PDCCH} SCS {120, 120} kHz

| Index | PDCCH monitoring occasions (SFN and slot number) | First symbol index (k = 0, 1, . . . 15) |
|---|---|---|
| 0 | $SFN'_C = SFN_{SSB, i}$<br>$n'_C = n_{SSB, i}$ or $n'_C = n_{SSB, i} + 1$ | 10, 11 for i = 4k, i = 4k + 1 ($n'_C = n_{SSB, i} + 1$),<br>12, 13 for i = 4k + 2, i = 4k + 3 ($n'_C = n_{SSB, i}$), |
| 1 | | Reserved |
| 2 | | Reserved |
| 3 | | Reserved |
| 4 | | Reserved |
| 5 | | Reserved |
| 6 | | Reserved |
| 7 | | Reserved |
| 8 | | Reserved |
| 9 | | Reserved |
| 10 | | Reserved |
| 11 | | Reserved |
| 12 | | Reserved |
| 13 | | Reserved |
| 14 | | Reserved |
| 15 | | Reserved |

TABLE 6

PDCCH monitoring occasions for CSS0-light - SS/PBCH block and CORESET (associated with Type0-PDCCH CSS set) for multiplexing pattern 2 and {SS/PBCH block, PDCCH} SCS {120, 60} kHz

| Index | PDCCH monitoring occasions (SFN and slot number) | First symbol index (k = 0, 1, . . . 15) |
|---|---|---|
| 0 | $SFN'_C = SFN_{SSB, i}$<br>$n'_C = n_{SSB, i}$ | 12 for i = 4k, i = 4k + 1<br>13 for i = 4k + 2, i = 4k + 3 |
| 1 | | Reserved |
| 2 | | Reserved |
| 3 | | Reserved |
| 4 | | Reserved |
| 5 | | Reserved |
| 6 | | Reserved |
| 7 | | Reserved |
| 8 | | Reserved |
| 9 | | Reserved |
| 10 | | Reserved |
| 11 | | Reserved |
| 12 | | Reserved |
| 13 | | Reserved |
| 14 | | Reserved |
| 15 | | Reserved |

TABLE 7

PDCCH monitoring occasions for CSS0-light - SS/PBCH block and CORESET (associated with Type0-PDCCH CSS set) for multiplexing pattern 2 and {SS/PBCH block, PDCCH} SCS {240, 240} kHz

| Index | PDCCH monitoring occasions (SFN and slot number) | First symbol index (k = 0, 1, . . . 7) |
| --- | --- | --- |
| 0 | $SFN'_C = SFN_{SSB,i}$<br>$n'_C = n_{SSB,i}$ or $n'_C = n_{SSB,i} + 1$ or<br>$n'_C = n_{SSB,i} + 2$ or $n'_C = n_{SSB,i} + 3$ | 6, 7 for i = 8k, i = 8k + 1 ($n'_C = n_{SSB,i} + 3$),<br>8, 9 for i = 8k + 2, i = 8k + 3 ($n'_C = n_{SSB,i} + 2$),<br>10, 11, 12 for i = 8k + 4, i = 8k + 5, i = 8k + 6<br>($n'_C = n_{SSB,i} + 1$)<br>13 for i = 8k + 7 ($n'_C = n_{SSB,i}$) |
| 1 | | Reserved |
| 2 | | Reserved |
| 3 | | Reserved |
| 4 | | Reserved |
| 5 | | Reserved |
| 6 | | Reserved |
| 7 | | Reserved |
| 8 | | Reserved |
| 9 | | Reserved |
| 10 | | Reserved |
| 11 | | Reserved |
| 12 | | Reserved |
| 13 | | Reserved |
| 14 | | Reserved |
| 15 | | Reserved |

TABLE 8

PDCCH monitoring occasions for CSS0-light - SS/PBCH block and CORESET (associated with Type0-PDCCH CSS set) for multiplexing pattern 2 and {SS/PBCH block, PDCCH} SCS {240, 120} kHz

| Index | PDCCH monitoring occasions (SFN and slot number) | First symbol index (k = 0, 1, . . . 7) |
| --- | --- | --- |
| 0 | $SFN'_C = SFN_{SSB,i}$<br>$n'_C = n_{SSB,i}$ or $n'_C = n_{SSB,i} + 1$ | 10 for i = 8k, i = 8k + 1 ($n'_C = n_{SSB,i} + 1$),<br>11 for i = 8k + 2, i = 8k + 3 ($n'_C = n_{SSB,i} + 1$),<br>12 for i = 8k + 4, i = 8k + 5, ($n'_C = n_{SSB,i}$),<br>13 for i = 8k + 6, i = 8k + 7 ($n'_C = n_{SSB,i}$) |
| 1 | | Reserved |
| 2 | | Reserved |
| 3 | | Reserved |
| 4 | | Reserved |
| 5 | | Reserved |
| 6 | | Reserved |
| 7 | | Reserved |
| 8 | | Reserved |
| 9 | | Reserved |
| 10 | | Reserved |
| 11 | | Reserved |
| 12 | | Reserved |
| 13 | | Reserved |
| 14 | | Reserved |
| 15 | | Reserved |

Figure 16:
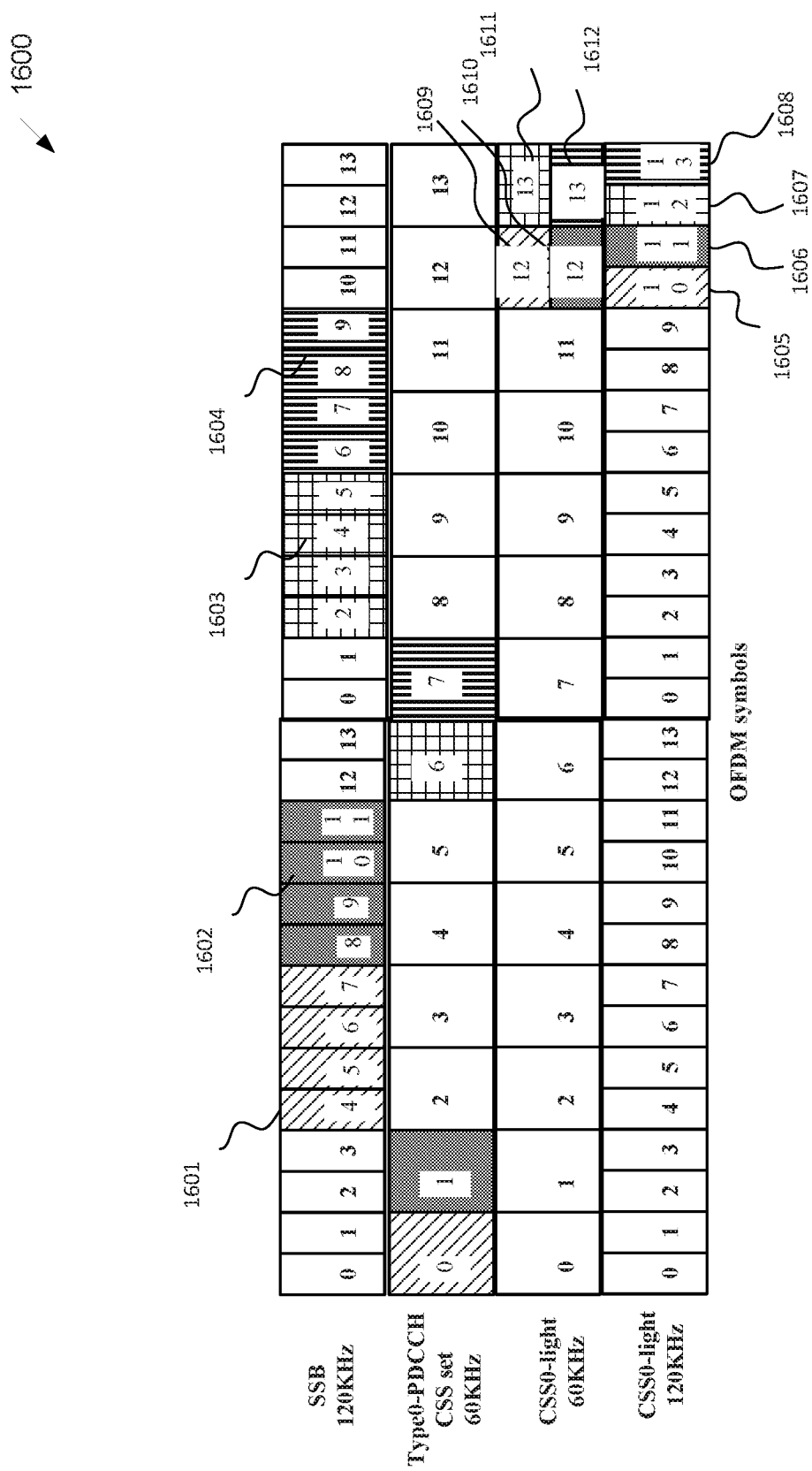
FIG. 16 illustrates an example monitoring occasions in CSS0-light according to embodiments of the present disclosure.

FIG. 16 illustrates an example monitoring occasions in CSS0-light 1600 according to embodiments of the present disclosure. An embodiment of the monitoring occasions in CSS0-light 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

FIG. 16 illustrates an example of monitoring occasions in CSS0-light when SS/PBCH block and CORESET multiplexing pattern 2 is configured for Type0-PDCCH CSS set, and SCS of SS/PBCH block is 120 KHz. The numbers in the figure are OFDM symbol indices. 1601, 1602, 1603, and 1604 indicate SS/PBCH block with index i, i+1, i+2, i+3, respectively. 1605, 1606, 1607, and 1608 indicate PDCCH monitoring occasion in CSS0-light associated with SS/PBCH block with index i, i+1, i+2, and i+3, respectively when PDCCH SCS in CSS0-light is 120 KHz. 1609, 1610, 1611, and 1612 indicate PDCCH monitoring occasion in CSS0-light associated with SS/PBCH block with index i, i+1, i+2, and i+3, respectively when PDCCH SCS in CSS0-light is 60 KHz. When PDCCH monitoring occasions associated with different SS/PBCH blocks are allocated in the same slot, PDCCH monitoring occasions can be assigned with orthogonal RBs in the frequency domain resources, as illustrated in FIG. 16.

Figure 17A:
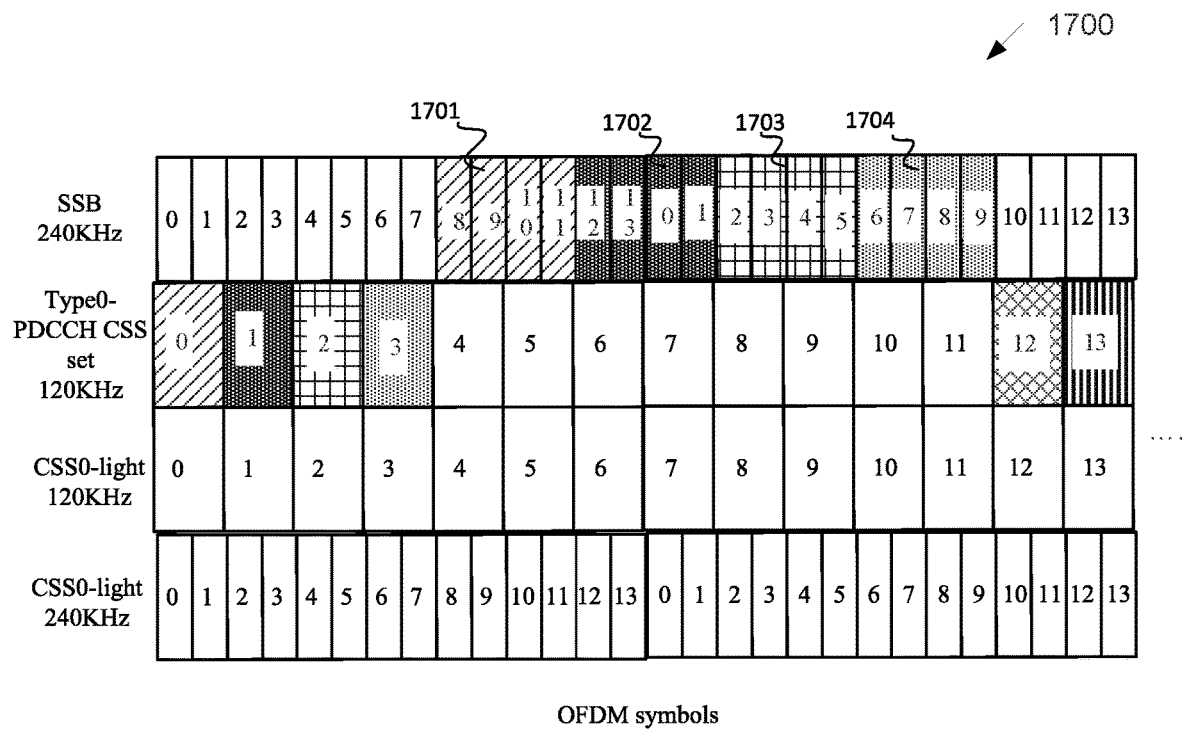
FIGS. 17A and 17B illustrate another example monitoring occasions in CSS0-light according to embodiments of the present disclosure.

FIG. 17A illustrates another example monitoring occasions in CSS0-light 1700 according to embodiments of the present disclosure. An embodiment of the monitoring occasions in CSS0-light 1700 shown in FIG. 17A is for illustration only. One or more of the components illustrated in FIG. 17A can be implemented in specialized circuitry configured to perform the noted functions or one or more of the components can be implemented by one or more processors executing instructions to perform the noted functions. Other embodiments are used without departing from the scope of the present disclosure.

Figure 17B:
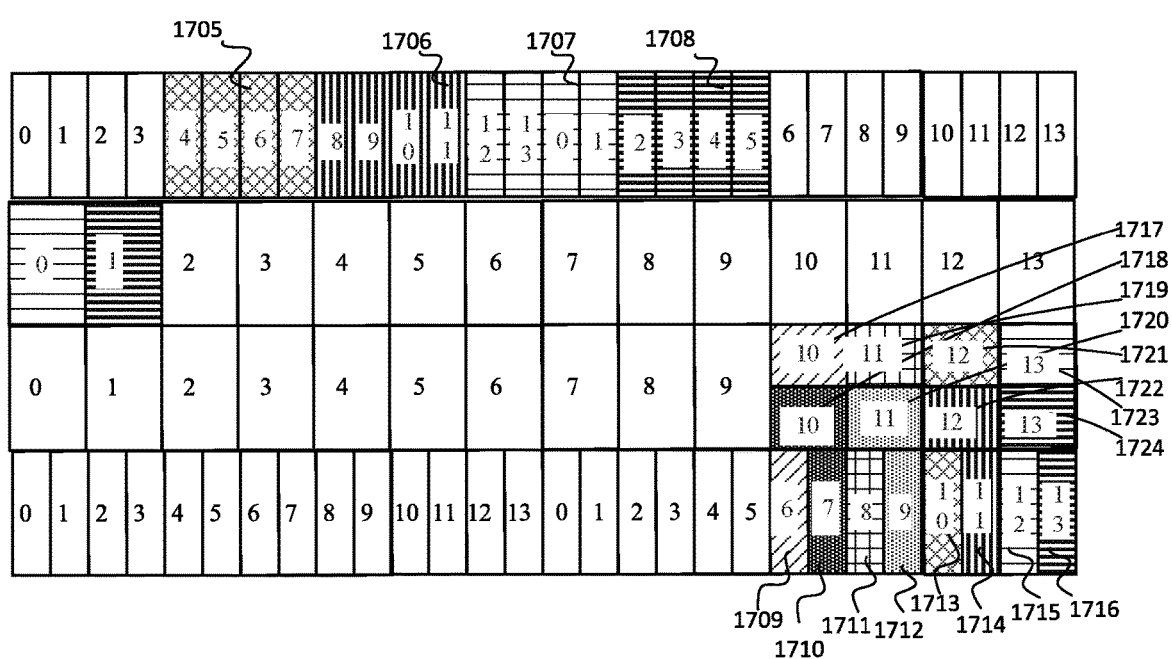

FIG. 17B illustrates another example monitoring occasions in CSS0-light 1750 according to embodiments of the present disclosure. An embodiment of the monitoring occasions in CSS0-light 1750 shown in FIG. 17B is for illustration only. One or more of the components illustrated in FIG. 17B can be implemented in specialized circuitry configured to perform the noted functions or one or more of the components can be implemented by one or more processors executing instructions to perform the noted functions. Other embodiments are used without departing from the scope of the present disclosure.

FIGS. 17A and 17B are connected figures. FIG. 17A is the first set of OFDM symbols and FIG. 17B is the second set of OFDM symbols. FIGS. 17A and 17B illustrates an example of monitoring occasions in CSS0-light when SS/PBCH block and CORESET multiplexing pattern 2 is configured for Type0-PDCCH CSS set, and SCS of SS/PBCH block is 240 KHz. The numbers in the figure are OFDM symbol indices. 1701, 1702, 1703, 1704, 1705, 1706, 1707, and 1708 indicate SS/PBCH block with index i, i+1, i+2, i+3, i+4, i+5, i+6, i+7, respectively. 1709, 1710, 1711, 1712, 1713, 1714, 1715, 1716 indicate PDCCH monitoring occasion in CSS0-light associated with SS/PBCH block with index i, i+1, i+2, i+3, i+4, i+5, i+6, i+7, respectively when PDCCH SCS in CSS0-light is 240 KHz. 1717, 1718, 1719, 1720, 1721, 1722, 1723, and 1724 indicate PDCCH monitoring occasion in CSS0-light associated with SS/PBCH block with index i, i+1, i+2, i+3, i+4, i+5, i+6, i+7, respectively when PDCCH SCS in CSS0-light is 120 KHz. When PDCCH monitoring occasions associated with different SS/PBCH blocks are allocated in the same slot, PDCCH monitoring occasions can be assigned with orthogonal RBs in the frequency domain resources, as illustrated in FIGS. 17A and 17B.

For the SS/PBCH block and CORESET multiplexing pattern 3 for legacy UEs, a Cat-L UE monitors PDCCH in the CSS0-light over Z slot(s) with CSS0-light periodicity equal to the periodicity of SS/PBCH block. For determination of Z, Z can be either fixed, for example, Z=1 or indicated by PBCH. For a SS/PBCH block with index i, the Cat-L UE determines the first slot index for PDCCH monitoring, i.e., $n''_C$, SFN index, i.e., $SFN''_C$, and the first symbol index within a monitoring occasion through any of the following methods.

In one example, the Cat-L UE assumes searchSpaceZero in pdcch-ConfigSIB1 indicates a row index to a configuration table for determining $n''_C$, $SFN''_C$ and first symbol index within a monitoring occasion dedicated to Cat-L UEs.

In one sub-example, the Cat-L UE assumes TABLE 9 as corresponding configuration table when SCS for SS/PBCH block and PDCCH in CSS0-light are 120 KHz and 120 kHz, respectively.

In another sub-example, when the value of searchSpaceZero is "0," the Cat-L UE assumes $SFN''_C = SFN_{SSB}$, $n''_C = n_{SSB,i}$, the first symbol index, are 5, 9, 3, 7 for i=4k, i=4k+1, i=4k+2, i=4k+3, respectively, where k=0, ..., 15, i is the index of associated SS/PBCH block.

In yet another sub-example, when the value of searchSpaceZero is "0," the Cat-L UE assumes $SFN''_C = SFN_{SSB,i}$, $n''_C = n_{SSB,i}$, the first symbol index, are 6, 10, 4, 8 for i=4k, i=4k+1, i=4k+2, i=4k+3, respectively, where k=0, ..., 15, i is the index of associated SS/PBCH block.

In yet another example, the Cat-L UE assumes $n''_C$ and $SFN''_C$ is derived from the slot index $n_C$ and $SFN_C$ for Type0-PDCCH CSS set. In one example, $n''_C = n_C + D3\_CSS0$. $SFN''_C = SFN_C$ if floor($n''_C/N^\frown$frame_slot) mod 2=0 or $SFN'_C = SFN_C + 1$ if floor($n''_C/N^\frown$frame_slot) mod 2=1, where $N^\frown$frame_slot is the number of slots within a frame, i.e., 10 ms. In one example, $$D3_{CSS0} = \frac{Lmax}{2} \cdot \frac{\mu^{CSS0}}{\mu^{SSB}}$$

where Lmax is the maximum number of SS/PBCH blocks in the initial BWP, $\mu^{SSB}$ and $\mu^{CSS0}$ are SCS configuration for SS/PBCH block and PDCCH in CSS0-light, respectively. For the first symbol index within a monitoring occasion, the first symbol index can be indicated by NR standard specification, which is same as Type0-PDCCH CSS set.

TABLE 9

PDCCH monitoring occasions for CSS0-light - SS/PBCH block and CORESET (associated with Type0-PDCCH CSS set) for multiplexing pattern 3 and {SS/PBCH block, PDCCH} SCS {120, 120} kHz

| Index | PDCCH monitoring occasions (SFN and slot number) | First symbol index (k = 0, 1, . . . 15) |
|---|---|---|
| 0 | $SFN''_C = SFN_{SSB,i}$<br>$n''_C = n_{SSB,i}$ or $n''_C = n_{SSB,i} - 1$ | 0, 2, 1 for i = 4k, i = 4k + 1, i = 4k + 3 ($n''_C = n_{SSB,i}$),<br>12 for i = 4k + 2 ($n''_C = n_{SSB,i} - 1$). |
| 1 | | Reserved |
| 2 | | Reserved |
| 3 | | Reserved |
| 4 | | Reserved |
| 5 | | Reserved |
| 6 | | Reserved |
| 7 | | Reserved |
| 8 | | Reserved |
| 9 | | Reserved |

TABLE 9-continued

PDCCH monitoring occasions for CSS0-light - SS/PBCH block and CORESET (associated with Type0-PDCCH CSS set) for multiplexing pattern 3 and {SS/PBCH block, PDCCH} SCS {120, 120} kHz

| Index | PDCCH monitoring occasions (SFN and slot number) | First symbol index (k = 0, 1, . . . 15) |
|---|---|---|
| 10 | | Reserved |
| 11 | | Reserved |
| 12 | | Reserved |
| 13 | | Reserved |
| 14 | | Reserved |
| 15 | | Reserved |

FIG. 18 illustrates yet another example monitoring occasions in CSS0-light 1800 according to embodiments of the present disclosure. An embodiment of the monitoring occasions in CSS0-light 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

FIG. 18 illustrates an example of monitoring occasions in CSS0-light when SS/PBCH block and CORESET multiplexing pattern 3 is configured for Type0-PDCCH CSS set, and SCS of SS/PBCH block is 120 KHz. The numbers in the figure are OFDM symbol indices. 1801, 1802, 1803, and 1804 indicate SS/PBCH block with index i, i+1, i+2, i+3, respectively. 1805, 1806, 1807, and 1808 indicate PDCCH monitoring occasion in CSS0-light associated with SS/PBCH block with index i, i+1, i+2, and i+3, respectively when PDCCH SCS in CSS0-light is 120 KHz.

In one example for determination of a configuration of CSS0-light, a Cat-L UE can be provided with an explicit configuration for CSS0-light dedicated to Cat-L UEs. The configuration can either be fixed (i.e., defined in the specification of system operation) or be carried by a physical layer signal/channel. In one example, the physical layer signal/channel is a PBCH dedicated to Cat-L UEs. In another example, the physical layer signal/channel is DM-RS of PBCH. In yet another example, the physical layer signal/channel is PBCH broadcasted to all UEs.

In one example for the configuration of CSS0-light, the configuration includes a parameter of monitoring periodicity, denoted as $T^{CSS0}$=, in unit of one slot or one millisecond. In one example, $T^{CSS0}$=is fixed, e.g., $T^{CSS0}$=160 ms or 20 ms.

In another example for the configuration of CSS0-light, the configuration includes a parameter of monitoring offset, denoted as $O^{CSS0}$, in unit of one slot. The candidate value for $O^{CSS0}$ can be any integer between 0 to $10 \cdot 2^u$, where u is the SCS configuration for the PDCCH in CSS0-light. A Cat-UE assumes the first slot for PDCCH monitoring in CSS0-light, i.e., $n_{s,f}^u$ with corresponding SFN index, i.e., $n_f$, such that $(n_f N_{slot}^{frame,u}+n_{s,f}^u-O^{CSS0}) \mod T^{CSS0}=0$, where $N_{slot}^{frame,u}$ is the number of slots in a frame or 10 ms given the SCS configuration for the initial BWP of u. In one example, $O^{CSS0}$ can be fixed, e.g., $$O^{CSS0} = \frac{Lmax}{2} \cdot \frac{\mu^{CSS0}}{\mu^{SSB}}$$

where Lmax is the maximum number of SS/PBCH blocks in the initial BWP, $\mu^{SSB}$ and $\mu^{CSS0}$ are SCS configuration for SS/PBCH block and PDCCH in CSS0-light, respectively.

In yet another example for the configuration of CSS0-light, the configuration includes a parameter of a time gap between the start of monitoring occasions associated with SS/PBCH block with index i and i+1. The time gap is denoted as $M^{CSS0}$. $M^{CSS0}$ can be in the unit of one OFDM symbol or one slot.

When $M^{CSS0}$ is in the unit of one OFDM symbol, a Cat-L UE assumes the start of PDCCH monitoring associated with SS/PBCH block with index i, is in the slot with index as $n_f + \lfloor (i \cdot M^{CSS0} + c0)/(N_{OS}^{slot,\mu 0} \cdot 2^\mu) \rfloor$, and the first OFDM symbol with index as $(i \cdot M^{CSS0} + c0) \mod (N_{OS}^{slot,\mu 0} \cdot 2^\mu)$, where $N_{OS}^{slot,\mu 0}$ is number of OFDM symbols per slot when SCS is 15 KHz, y is the SCS configuration of PDCCH in CSS0-light, c0 is the symbol offset for the start of OFDM symbol for PDCCH monitoring associated with SS/PBCH block with index 0. In one example, c0=0.

When $M^{CSS0}$ is in the unit of one slot, the configuration can include an indication of the first symbol index for PDCCH monitoring occasion associated with a SS/PBCH block with index i. In one example, the first OFDM symbol can be fixed, e.g., 0, for any PDCCH monitoring occasion.

FIG. 19 illustrates an example explicit configuration of CSS0-light 1900 according to embodiments of the present disclosure. An embodiment of the explicit configuration of CSS0-light 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

FIG. 19 illustrates an example of explicit configuration of CSS0-light. 1901, 1902, 1903, and 1904 indicates SS/PBCH block with index 0, 1, 2 and 3, respectively. 1905, 1906, 1907, and 1908 indicates PDCCH monitoring occasion/duration associated with SS/PBCH block with index 0, 1, 2, and 3, respectively. The time gap between two consecutive monitoring occasions, in 1910, equals to number of CORESET symbols, such that $M^{CSS0}$=2. The monitoring offset, $O^{CSS0}$ in 1909 is determined by maximum number of SS/PBCH blocks, Lmax, in this example, Lmax=4, $O^{CSS0}$=Lmax/2=2 slots, given same SCS configuration for SS/PBCH block transmission and PDCCH in CSS0-light.

In one example for determining the configuration parameters from a physical layer signal/channel, the configuration parameters are indicated separately. For each parameter, a list of candidate values is defined in the specification of system operation, and the physical layer signal/channel carries an indication to select one of the candidate values.

In one example for determining the configuration parameters from a physical layer signal/channel, the configuration parameters can be indicated jointly. The physical layer signal/channel indicates a row index to a configuration table, where the column of the table is associated with candidate values for a configuration parameter. The configuration table is predefined in the specification of the system operation. TABLE 10 is an example of configuration table for joint indication on CSS0-light configuration parameters, including $O^{CSS0}$ and $M^{CSS0}$

TABLE 10

Joint indication on CSS0-light configuration parameters.

| Index | PDCCH monitoring offset, $O^{CSS0}$ | $M^{CSS0}$ |
|---|---|---|
| 0 | 2 | 2 |
| 1 | ... | ... |

In one embodiment, determination of a CORESET #0 is provided for PDCCH candidates monitoring by Cat-L UEs with configuration provided to Cat-L UEs before RMSI reception. For the simplicity of expression, the CORESET #0 dedicated to Cat-L UEs is referred as CORESET0-light in this disclosure.

In one example for determination of CORESET #0-light, the configuration is derived implicitly from the configuration of legacy CORESET #0 configured by controlResourceSetZero in pdcch-ConfigSIB1. The Cat-L UE assumes controlResourceSetZero in pdcch-ConfigSIB1 indicates a row index to a configuration table dedicated to Cat-L UEs. A row of the configuration table can join indicating candidate value for any of the parameters, such as SS/PBCH block and CORESET multiplexing pattern or number of RBs, denoted as $N^L\_RB$ or number of symbols, denoted as $N^L\_symb$, or offset (RBs), denoted as $O^L\_RBs$.

The dedicated configuration table associated with CORESET #0-light is predefined in the specification of system operation with a row indicating any of the following configuration: a row of $\{N^L\_RB, N^L\_symb, O^L\_RBs\}=\{24, 2, 0\}$; a row of $\{N^L\_RB, N^L\_symb, O^L\_RBs\}=\{24, 2, 2\}$; a row of $\{N^L\_RB, N^L\_symb, O^L\_RBs\}=\{24, 2, 4\}$; a row of $\{N^L\_RB, N^L\_symb, O^L\_RBs\}=\{24, 3, 0\}$; a row of $\{N^L\_RB, N^L\_symb, O^L\_RBs\}=\{24, 3, 2\}$; a row of $\{N^L\_RB, N^L\_symb, O^L\_RBs\}=\{24, 3, 4\}$; a row of $\{N^L\_RB, N^L\_symb, O^L\_RBs\}=\{24, 4, 0\}$; a row of $\{N^L\_RB, N^L\_symb, O^L\_RBs\}=\{24, 4, 2\}$; a row of $\{N^L\_RB, N^L\_symb, O^L\_RBs\}=\{24, 4, 4\}$; a row of $\{N^L\_RB, N^L\_symb, O^L\_RBs\}=\{24, 6, 0\}$; a row of $\{N^L\_RB, N^L\_symb, O^L\_RBs\}=\{24, 6, 2\}$; and a row of $\{N^L\_RB, N^L\_symb, O^L\_RBs\}=\{24, 6, 4\}$.

In one example for determination of CORESET #0-light, a Cat-L UE can be provided with an explicit configuration for CORESET #0-light dedicated to Cat-L UEs. The configuration can either be fixed (i.e., defined in the specification of system operation) or be carried by a physical layer signal/channel. In one example, the physical layer signal/channel is a PBCH dedicated to Cat-L UEs. In another example, the physical layer signal/channel is DM-RS of PBCH. In yet another example, the physical layer signal/channel is PBCH broadcasted to all UEs.

In one example for the configuration of CORESET #0-light, the configuration includes a parameter of number of RBs of CORESET #0-light, i.e., $N^L\_RB$. In one example $N^L\_RB$ fixed and defined in the specification of system operation per SCS configuration, e.g., $N^L\_RB=24$ for SCS=15 KHz or 30 KHz.

In one example for the configuration of CORESET #0-light, the configuration includes a parameter of number of OFDM symbols of CORESET #0-light, i.e., $N^L\_symb$. In one example $N^L\_symb$ fixed and defined in the specification of system operation, e.g., $N^L\_RB=3$ or 6.

In one example for the configuration of CORESET #0-light, the configuration includes a parameter of Offset of RBs, i.e., $O^L\_RB$. $O^L\_RB$ indicates the offset in terms number of RBs from the smallest RB index of the CORESET #0-light to the smallest RB index of the common RB overlapping with the first RB of the corresponding SS/PBCH block; the value can be positive or negative integer. When the value is positive, the value indicates the smallest RB index of CORSET #0-light is smaller than the smallest RB index of the common RB overlapping with the first RB of the corresponding SS/PBCH block; otherwise, when the value is negative, the value indicates the smallest RB index of CORSET #0-light is larger than the smallest RB index of the common RB overlapping with the first RB of the corresponding SS/PBCH block.

In one example for the configuration of CORESET #0-light, the configuration includes an antenna port quasi co-location (QCL), indicating QCL information of the DM-RS antenna port for PDCCH receptions in CORESET #0-light. The antenna port QCL can be determined as one of: the antenna port QCL of CORESET #0-light that is QCLed with one or more DL RS provided by a TCI state, where the TCI state is indicated by a MAC CE activation command for the CORESET #0-light; the antenna port QCL of CORESET #0-light that is QCLed with an associated SS/PBCH that the UE identified during a most recent random access procedure not initiated by a PDCCH order that triggers a non-contention based random access procedure, if no MAC CE activation command indicting a TCI state for the CORESET #0-light is received after the most recent random access procedure; or the antenna port QCL of CORESET #0-light that is same as NR Rel-15 CORESET #0. The QCL properties (TCI state) for a PDCCH reception in CORESET #0-light is determined by the antenna port quasi co-location of the CORESET #-light.

The configuration parameters of CORESET #0-light can be provided to the UE either separately or jointly, for example through different fields of MIB, or be jointly encoded, for example in one field of MIB. In the latter case, one or more candidate tables with candidate values for CORESET #0-light configuration parameters can be predefined in the specification of the system operation with respect to different numerology of SS/PBCH block and PDCCH, and a row index of the table can be provided to the UE to indicate corresponding configuration. The UE can determine the configuration of CORESET #0-light or the value of any above parameters from the specification of the system operation or a physical layer signal/channel or the combination of both.

In one example for determining the configuration parameters from a physical layer signal/channel, the configuration parameters are be indicated separately. For each parameter, a list of candidate values is defined in the specification of system operation, and the physical layer signal/channel carries an indication to select one of the candidate values.

In one example for determining the configuration parameters from a physical layer signal/channel, the configuration parameters can be indicated jointly. The physical layer signal/channel indicates a row index to a configuration table, where the column of the table is associated with candidate values for a configuration parameter. The configuration table is predefined in the specification of the system operation.

In one example, the configuration table for CORESET #0-light can be same as the configuration table for legacy CORESET #0 as defined in NR specification excluding rows with CORESET BW larger than a threshold. The threshold can be predetermined, for example, the threshold is the maximum UE operation bandwidth for initial access. When the UE is indicated with an invalid row, the UE can apply a default configuration of CORESET #0-light. The default configuration can be predetermined.

In one embodiment, determination of a PDSCH grant is provided for transmission of RMSI from a serving gNB to Cat-L UEs without PDCCH monitoring. The RMSI is referred as RMSI-light in this disclosure.

A Cat-L UE can be provided with a PDSCH grant or scheduling information for RMSI-light reception including any of the following parameters: a binary bit indicates whether or not the PDSCH for RMSI-light is transmitted by the serving cell; time-domain resources assignment for the PDSCH, including any of the following: slot offset, i.e., O^RMSI_slot, relative to the slot index of associated SS/PBCH block; first OFDM symbol, i.e., startOS; and number of OFDM symbols, N^RMSI_OS; For example, N^RMSI_OS=4; frequency-domain resources assignment for the PDSCH, including any of the following: number of RBs, i.e., N^RMSI_RB; and start RB, i.e., n^RMSI_RB; transport block size (TBS); a number of repetitions for the PDSCH, i.e., N_rep. N_rep>=1 indicates a TB in PDSCH is repeated in N_rep consecutive slots. The candidate value of N_rep can be any value from 1 to N_rep max, for example, N_rep max 2 or 4 or 8 or 16 or 32 or 64; numerology of RMSI; if not indicated, the numerology of RMSI can be same as the associated SS/PBCH block; modulation and coding scheme (MCS); redundancy version (RV), i.e., n_RV. n_RV can be 2 bits and indicate a value from a predetermined list, for example, L_RV={0, 1, 2, 3}. When the grant indicates repetitions on RMSI-light, n_RV, indicates the RV for the first repetition, the index of RV from the list for the $i^{th}$ repetition can be floor(i/4)+n_RV. Alternatively, the first repetition can always be transmitted with the first RV from the list, i.e., 0; and VRB-to-PRB mapping, and a binary bit to indicate whether or not PRB interleaving is enabled on the PDSCH for RMSI.

A Cat-L UE can determine the PDSCH grant, i.e., scheduling information for the transmission of a PDSCH of RMSI from a serving cell to Cat-L UEs, through any of the following methods.

In one example, the scheduling information can be fixed and defined in the specification of system operation.

In another example, the scheduling information can be provided to the UE through a physical layer signal/channel, for example, in PBCH. The PDSCH grant can be provided to the UE either separately or jointly. In the former case, different parameters can be indicated through different fields in the physical layer signal/channel. For the latter case, all the relevant parameters can be jointly encoded and indicated by one field in the physical layer signal/channel.

Figure 20:
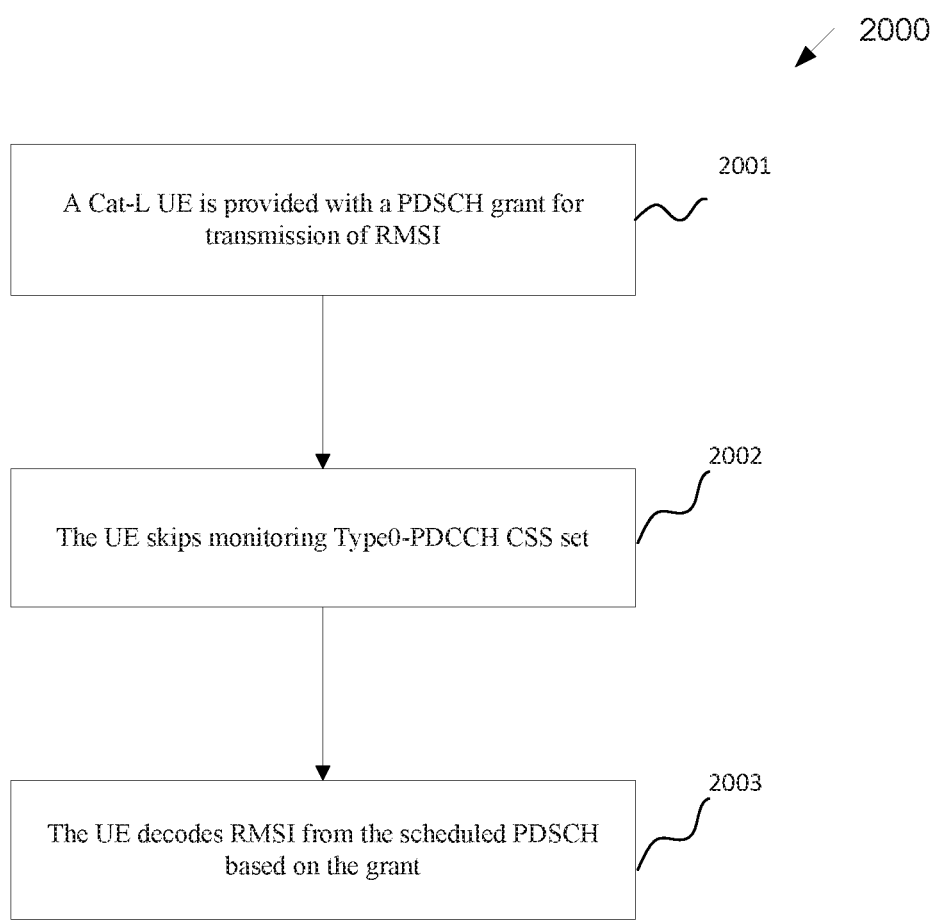
FIG. 20 illustrates a flowchart of a method for RMSI reception of UE according to embodiments of the present disclosure.

FIG. 20 illustrates a flowchart of a method 2000 for RMSI reception of UE according to embodiments of the present disclosure. An embodiment of the method 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

FIG. 20 illustrates UE procedure for RMSI reception based on a PDSCH grant without PDCCH monitoring.

As illustrated in FIG. 20, a Cat-L UE can be provided with a PDSCH grant for the transmission of RMSI, in step 2001. The PDSCH grant can be either predefined in the specification of the system operation or provided to the UE through a physical layer signal/channel other than PDCCH. For example, the PDSCH grant can be carried in the reserved bits of NR Rel-15 PBCH. For another example, the PDSCH grant can be carried in the content or DM-RS of a PBCH dedicated to Cat-L UEs. For yet another example, the PDSCH grant can be carried in in the content or DM-RS of a PBCH in a SS/PBCH dedicated to Cat-L UEs. The UE skips monitoring Type0-PDCCH CSS set in step 2002. The UE decodes RMSI from the scheduled PDSCH based on the grant, in step 2003.

In one example of a PDSCH grant for the transmission of RMSI-light, the RMSI-light can be mapped into the available OFDM symbols between SS/PBCH blocks in a SS/PBCH transmission burst. In this case, there is one to one mapping between a PDSCH grant for the transmission of RMSI-light and an SS/PBCH block, and RMSI-light is multiplexed with an SS/PBCH block in time domain. UE can assume any of the following for the time resources in terms of OFDM symbols for RMSI-light.

In one example, the RMSI-light can be mapped into one or two available OFDM symbols after the associated SS/PBCH block, that is not occupied by other SS/PBCH block(s) or other RMSI-light(s).

In another example, the RS-light can be mapped into one or two available OFDM symbols before the associated SS/PBCH block, that is not occupied by other SS/PBCH block(s) or other RMSI-light(s).

Figure 21:
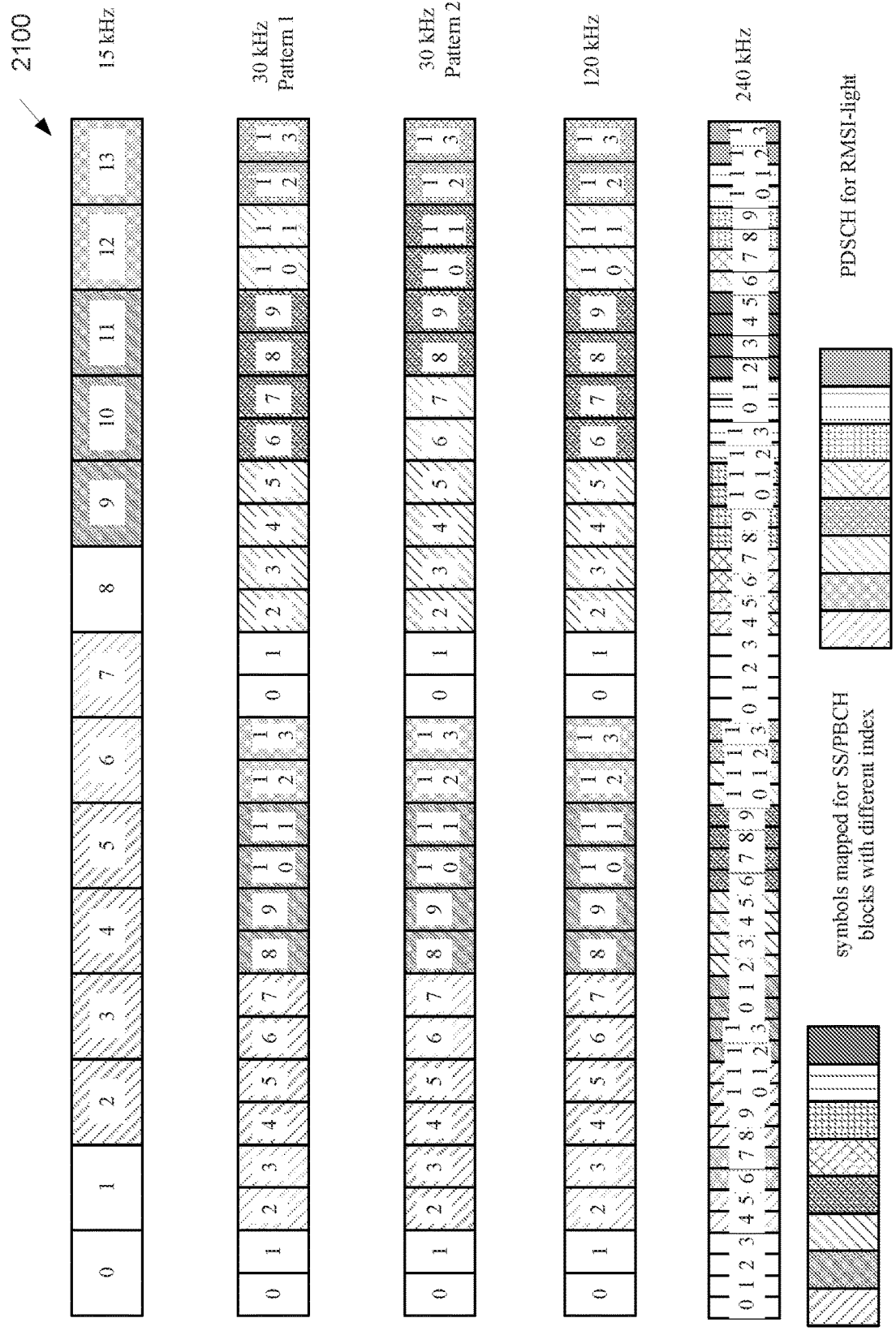
FIG. 21 illustrates an example PDSCH grant for RMSI-light according to embodiments of the present disclosure.

FIG. 21 illustrates an example PDSCH grant 2100 for RMSI-light according to embodiments of the present disclosure. An embodiment of the PDSCH grant 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

FIG. 21 illustrates an example of PDSCH grant for the transmission of RMSI-light multiplexed with an SS/PBCH block in time domain.

In one example, for SS/PBCH SCS of 15 KHz, PDSCH for RMSI-light is mapped into the next two consecutive OFDM symbols after the associated SS/PBCH block in the same slot, such that: OFDM symbol with index 6 and 7 are for PDSCH grant for the transmission of RMSI-light associated with a SS/PBCH block in OFDM symbols #2-5 in the same slot; and OFDM symbol with index 12 and 13 are for PDSCH grant for the transmission of RMSI-light associated with a SS/PBCH block in OFDM symbols #8-11 in the same slot.

In one example, for SS/PBCH SCS of 30 KHz Pattern 1, PDSCH grant for the transmission of RMSI-light is mapped into either the two consecutive OFDM symbols before a SS/PBCH block or next two consecutive OFDM symbols after a SS/PBCH block in the same slot, such that: OFDM symbol with index 2 and 3 are for PDSCH grant for the transmission of RMSI-light associated with a SS/PBCH block in OFDM symbols #4-7 in the same slot; OFDM symbol with index 12 and 13 are for PDSCH grant for the transmission of RMSI-light associated with a SS/PBCH block in OFDM symbols #8-11 in the same slot; OFDM symbol with index 10 and 11 are for PDSCH grant for the transmission of RMSI-light associated with a SS/PBCH block in OFDM symbols #2-5 in the same slot; and OFDM symbol with index 12 and 13 are for PDSCH grant for the transmission of RMSI-light associated with a SS/PBCH block in OFDM symbols #6-9 in the same slot.

In one example, for SS/PBCH SCS of 30 KHz Pattern 2, PDSCH grant for the transmission of RMSI-light is mapped into the next two consecutive OFDM symbols after the associated SS/PBCH block in the same slot, such that: OFDM symbol with index 6 and 7 are for PDSCH grant for the transmission of RMSI-light associated with a SS/PBCH block in OFDM symbols #2-5; and OFDM symbol with index 12 and 13 are for PDSCH grant for the transmission of RMSI-light associated with a SS/PBCH block in OFDM symbols #8-11.

In one example, for SS/PBCH SCS of 120 KHz, PDSCH grant for the transmission of RMSI-light is mapped into either the two consecutive OFDM symbols before a SS/PBCH block or next two consecutive OFDM symbols after a SS/PBCH block in the same slot, such that: OFDM symbol with index 2 and 3 are for PDSCH grant for the transmission of RMSI-light associated with a SS/PBCH block in OFDM symbols #4-7 in the same slot; OFDM symbol with index 12 and 13 are for PDSCH grant for the transmission of RMSI-light associated with a SS/PBCH block in OFDM symbols #8-11 in the same slot; OFDM symbol with index 10 and 11 are for PDSCH grant for the transmission of RMSI-light associated with a SS/PBCH block in OFDM symbols #2-5 in the same slot; and OFDM symbol with index 12 and 13 are for PDSCH grant for the transmission of RMSI-light associated with a SS/PBCH block in OFDM symbols #6-9 in the same slot.

In one example, for SS/PBCH SCS of 240 KHz, PDSCH grant for the transmission of RMSI-light is mapped into two consecutive OFDM symbols either before or after a SS/PBCH block in the same slot or previous slot or next slot, such that: OFDM symbols with index 4 and 5 are for PDSCH grant for the transmission of RMSI-light associated with a SS/PBCH block in OFDM symbols #8-11 in the same slot; OFDM symbols with index 6 and 7 are for PDSCH grant for the transmission of RMSI-light associated with a SS/PBCH block in OFDM symbols #12-13 in the same slot and #0-1 in next slot; OFDM symbol with index 10 and 11 are for PDSCH grant for the transmission of RMSI-light associated with a SS/PBCH block in OFDM symbols #2-5 in the same slot; OFDM symbol with index 12 and 13 are for PDSCH grant for the transmission of RMSI-light associated with a SS/PBCH block in OFDM symbols #6-9 in the same slot; OFDM symbol with index 6 and 7 are for PDSCH grant for the transmission of RMSI-light associated with a SS/PBCH block in OFDM symbols #4-7 in the previous slot; OFDM symbol with index 8 and 9 are for PDSCH grant for the transmission of RMSI-light associated with a SS/PBCH block in OFDM symbols #8-11 in the previous slot; OFDM symbol with index 10 and 11 are for PDSCH grant for the transmission of RMSI-light associated with SS/PBCH block in OFDM symbols #12-13 in the previous slot and #0-1 in the same slot; and OFDM symbol with index 12 and 13 are for PDSCH grant for the transmission of RMSI-light associated with SS/PBCH block in OFDM symbols #2-5 in the same slot.

Figure 22:
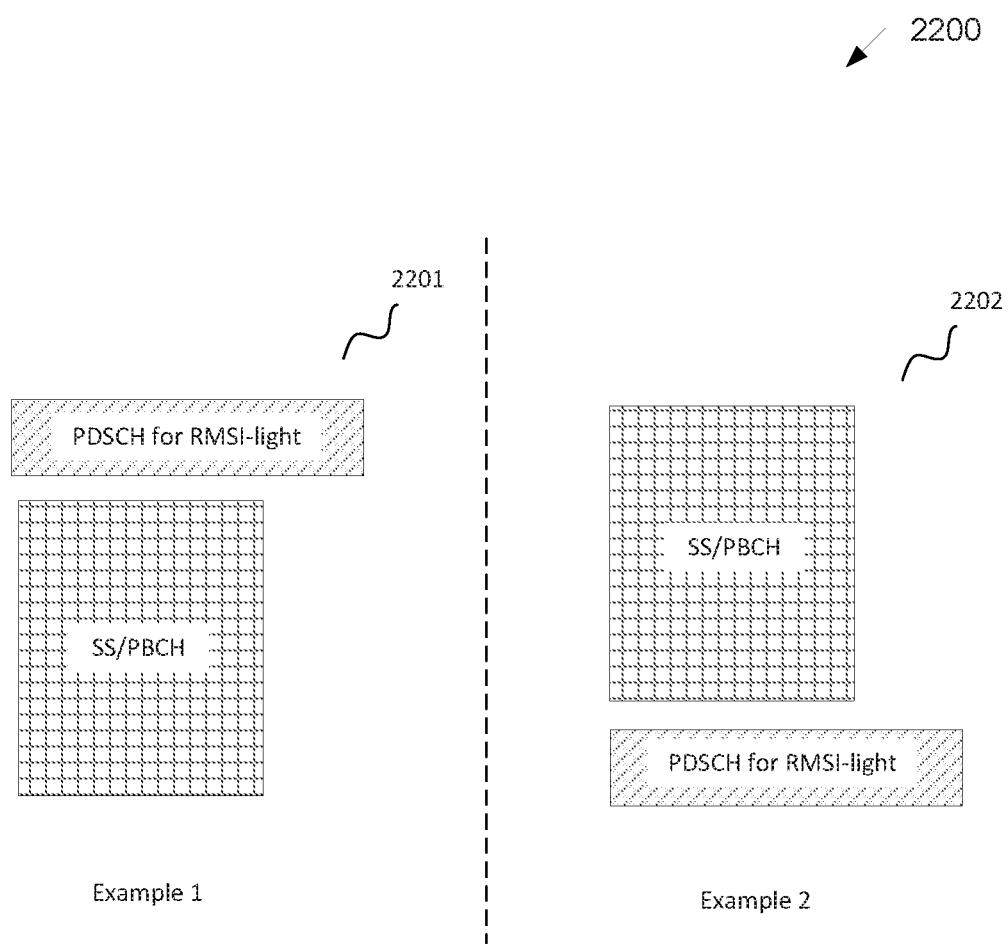
FIG. 22 illustrates an example PDSCH grant for RMSI-light multiplexed with PBCH block in frequency domain according to embodiments of the present disclosure.

FIG. 22 illustrates an example PDSCH grant 2200 for RMSI-light multiplexed with PBCH block in frequency domain according to embodiments of the present disclosure. An embodiment of the PDSCH grant 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

In another example of a PDSCH grant for the transmission of RMSI-light, the granted PDSCH is multiplexed with an SS/PBCH in the frequency domain. As illustrated in FIG. 22, The start symbol of PDSCH is same as the start symbol of associated SS/PBCH block. In one example 2201, the granted PDSCH can be above the associated SS/PBCH block. In another example 2202, the granted PDSCH is below the associated SS/PBCH block.

Figure 23:
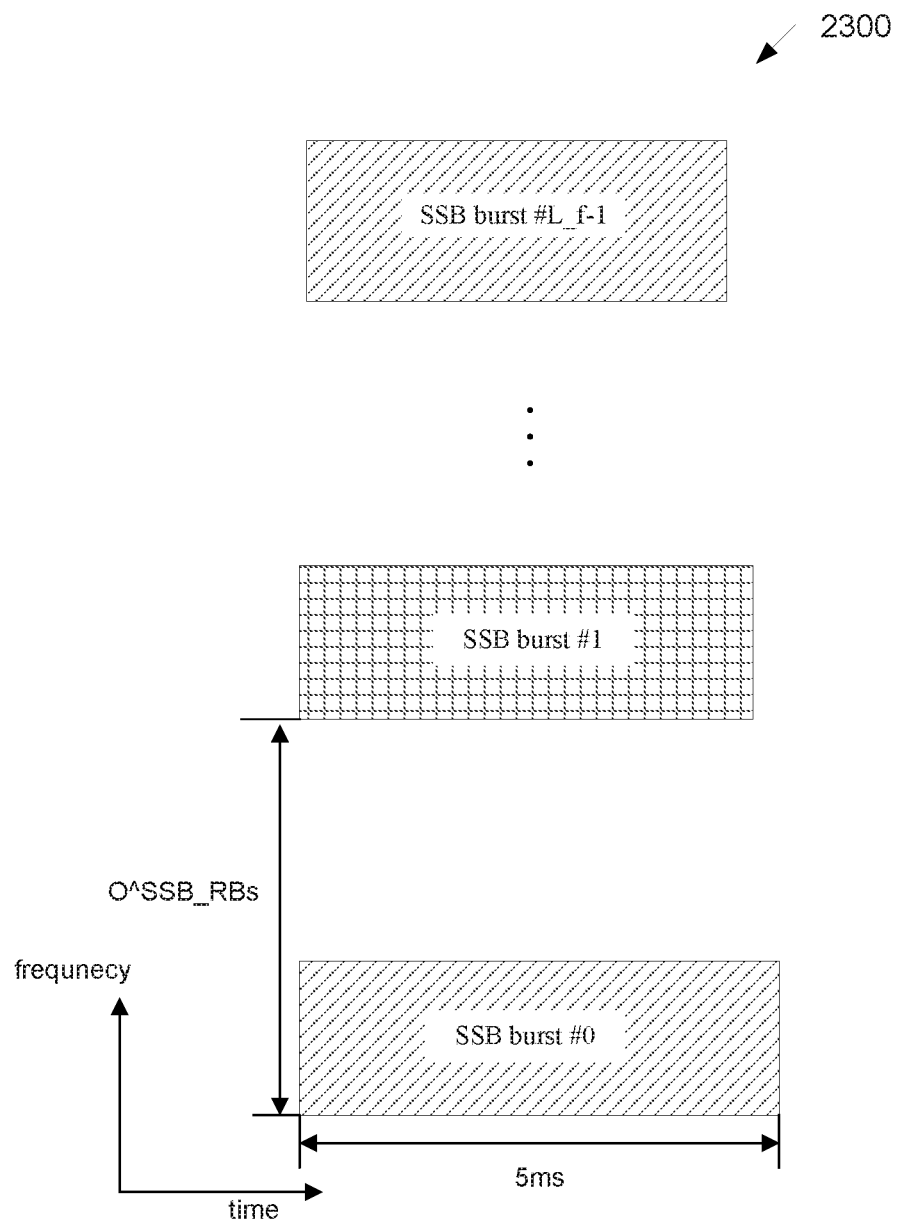
FIG. 23 illustrates an example multiple SSBs according to embodiments of the present disclosure.

FIG. 23 illustrates an example multiple SSBs 2300 according to embodiments of the present disclosure. An embodiment of the multiple SSBs 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions. Other embodiments are used without departing from the scope of the present disclosure.

In one embodiment, $L\_f > 1$ possible/maximum locations is provided in the frequency domain for the transmission of a burst of SSBs from a serving cell, such that $L\_f$ bursts of SSBs are frequency division multiplexed (FDMed) into non-overlapped resource blocks (RBs) as illustrated in FIG. 23. A burst of SSBs consists of maximum $L\_max$ SSBs within a half frame. Each SS/PBCH block including a physical layer broadcast channel (PBCH), primary synchronization signal (PSS) and secondary synchronizations signal (SSS) is mapped into resource elements in consecutive symbols. A UE assumes a SSB is associated with a frequency domain index, $0 <= n\_f < L\_f$, $n\_f$ is referred as SSB burst index in this disclosure, and a time domain index to indicate the index within a SSB burst.

For $L\_f$, a UE can either assume a common value for all SCS, for example $L\_f=2$ or assume different $L\_f$ per SCS, for example, $L\_f=2$ for SCS of 15 KHz or 30 KHz, while $L\_f=4$ or 8 for SCS of 120 KHz or 240 KHz.

For each of the $L\_f$ FDMed SSB bursts, an SSB burst index, $n\_f=0, \ldots, L\_f-1$, can be carried in any physical layer signal/channel of an SSB within the burst. A UE can determine $n\_f$ through any of the following.

In one example, the UE assumes $n\_f$ is carried in one or more reserved bits in the content of PBCH.

In another example, the UE assumes $n\_f$ is indicated by DMRS of PBCH.

In yet another example, the UE assumes $n\_f$ is indicated by PSS.

In yet another example, the UE assumes $n\_f$ is indicated by SSS.

A UE can determine the frequency domain location of $L\_f > 1$ SSB bursts through at least one of the following: in one example, the UE assumes a gap in terms of number of RBs between the smallest RB of any two consecutive SSB bursts, O^SSB_RBs. O^SSB_RBs>=20 can be predefined in the specification of the system operation, for example, O^SSB_RBs=24; or in another example, the UE assumes $L\_f$ SSB bursts are mapped into non-overlapped RBs in the ascending/descending order of SSB burst index with flexible gap, such that $n\_f^{th}$ ($n\_f=0, \ldots, L\_f-1$) SSB burst is mapped into RBs with higher/lower RB indices than $(n\_f-1)^{th}$ SSB burst.

A UE can determine the quasi co-located (QCL) assumptions among the L_f SSB bursts, through any of the following: in one example, the UE assumes SSBs with the same SSB index in the L_f SSB bursts are QCLed with respect to average gain or QCL-TypeA, or QCL-TypeD properties; and/or in another example, the UE assumes no QCL assumption among the L_f SSB bursts.

A UE can be provided with a configuration for initial access, such as configuration of CORESET #0 and Type0-PDCCH CSS set, through a PBCH in an SSB. To avoid congestion or PDCCH resources blocking during initial access, a UE can be distributed across the L_f>1 FDMed SSB bursts for initial access.

In one approach of distributing UEs for initial access, a UE is provided with a configuration of maximum/possible FDMed SSB bursts in advance. When the UE detects an SSB burst, the UE can derive the frequency location of other SSB burst(s). The UE can randomly select one SSB burst for PBCH reception and receive configuration for initial access in the PBCH.

Figure 24:
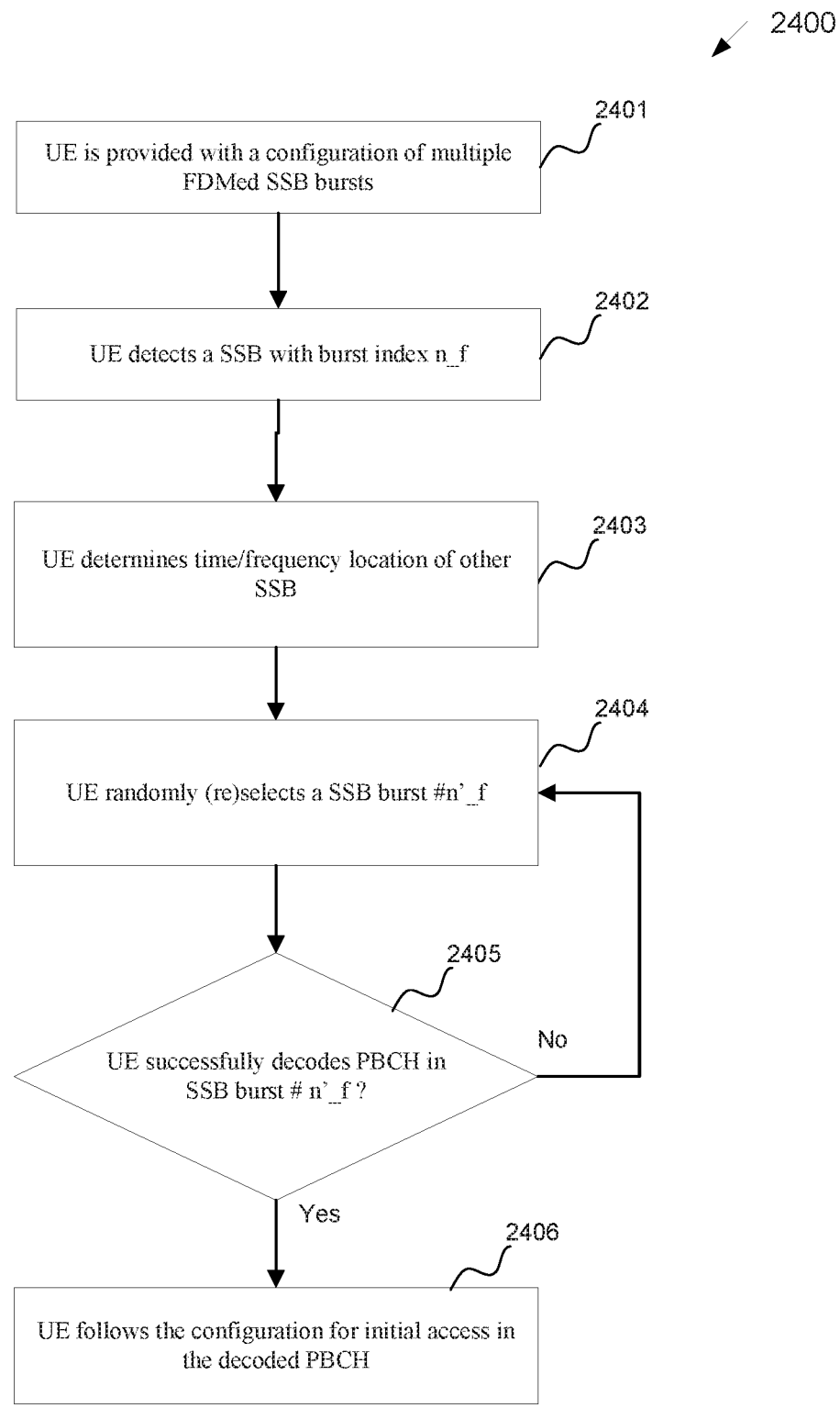
FIG. 24 illustrates a flowchart of a method for a configuration of multiple FDMed SSB bursts according to embodiments of the present disclosure.

FIG. 24 illustrates a flowchart of a method 2400 for a configuration of multiple FDMed SSB bursts according to embodiments of the present disclosure. An embodiment of the method 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure.

FIG. 24 illustrates an example of a UE procedure for SSB reception based on the distribution UEs for initial access.

As illustrated in FIG. 24, a UE is provided with a configuration of multiple FDMed SSB bursts per cell from the specification of the system operation in step 2401. The UE detects an SSB with burst index n_f in step 2402. The UE determines the time/frequency location of other SSB relative to detected SSB based on the configuration in step 2403. The UE randomly selects one SSB burst index $0<=n'\_f<L\_f$ for initial access or PBCH decoding in step 2405. The UE determines whether or not the UE successfully decodes a PBCH in SSB burst #n'_f in step 2405. When the UE successfully decodes a PBCH in SSB burst #n'_f, the UE then follows the configuration for initial access in the decoded PBCH in step 2406. Otherwise, when the UE fails on decoding the PBCH in SSB burst #n'_f, the UE then re-select an SSB burst #n'_f in step 2404.

In one embodiment for distributing UEs for initial access, a UE is provided with a configuration of maximum/possible FDMed SSB bursts and a default SSB burst for initial access in advance. The default SSB burst index, n0_f, can be associated with UE ID, n^UE_ID. For example, n0f=mod (n^UE_ID, L_f). The UE ID can be or be derived from the International Mobile Subscriber Identity (IMSI), or SAE Temporary Mobile Subscriber Identity (s-TMSI). UE decodes PBCH for the configuration for initial access in a PBCH in default SSB burst #n'_f.

Figure 25:
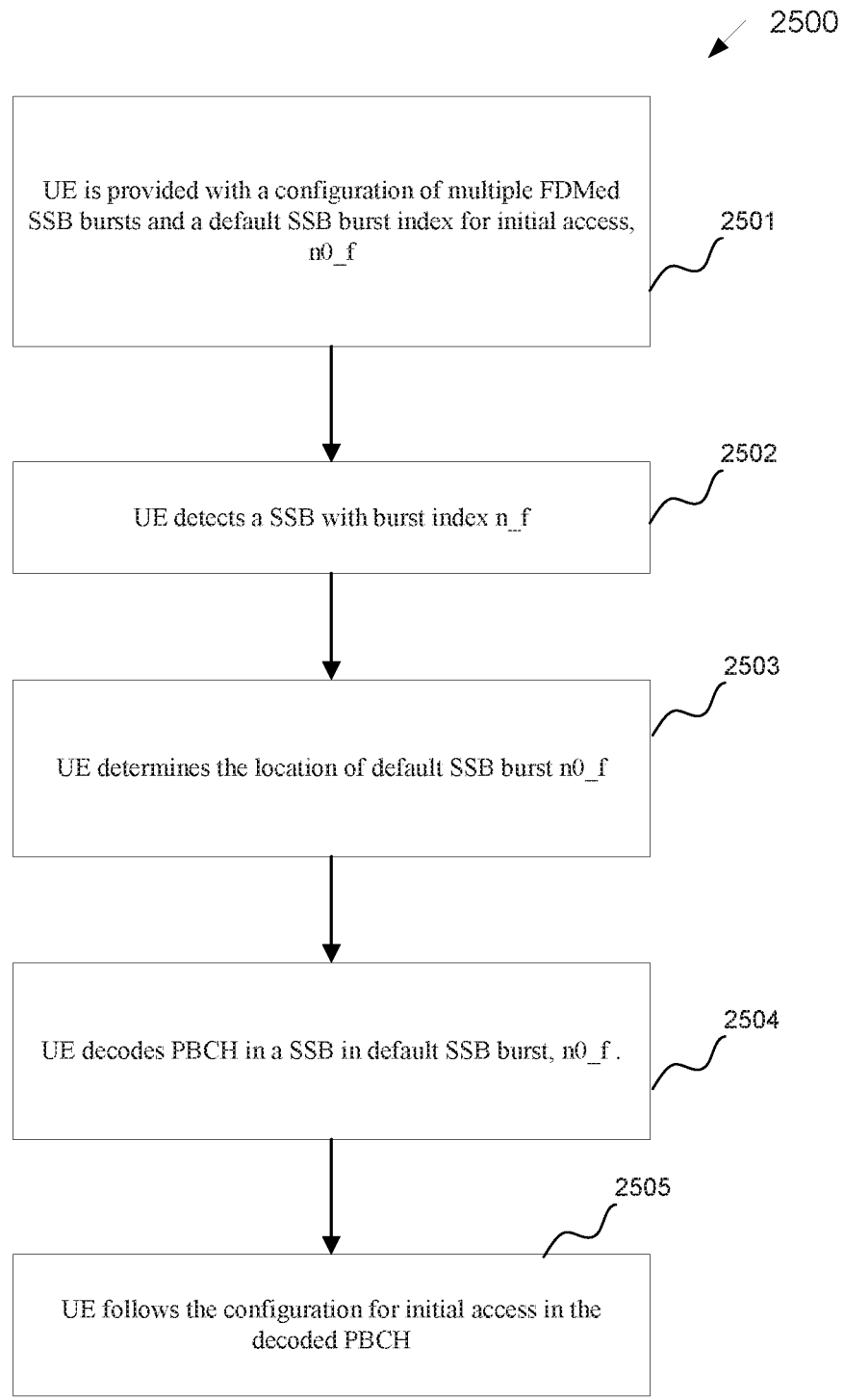
FIG. 25 illustrates a flowchart of a method for a configuration of $L\_f$ FDMed SSB bursts according to embodiments of the present disclosure.

FIG. 25 illustrates a flowchart of a method 2500 for a configuration of L_f FDMed SSB bursts according to embodiments of the present disclosure. An embodiment of the method 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions. Other embodiments are used without departing from the scope of the present disclosure.

FIG. 25 illustrates an example of a UE procedure for SSB reception based on the distribution UEs for initial access.

As illustrated in FIG. 25, a UE is provided with a configuration of L_f FDMed SSB bursts from the specification of the system operation, and a default SSB burst index, $0<=n0\_f<L\_f$, for initial access in step 2501. The UE detects an SSB with burst index n_f in step 2502. The UE determines the time/frequency location for SSBs in SSB burst #n0_f relative to detected SSB based on predetermined configuration in step 2503. The UE decodes PBCH in an SSB within default SSB burst #n0_f in step 2504. The UE follows the configuration for initial access in the decoded PBCH in step 2505.

In one embodiment for distributing UEs for initial access, UEs are divided into groups for initial access. A UE can be provided with a UE group ID, n^UG_ID. For example, n^UG_ID=mod (n^UEID, N_UG), where n^UE_ID is UE ID, and N_UG is number of UE groups. The UE ID can be or be derived from the international mobile subscriber identity (IMSI), or SAE temporary mobile subscriber identity (s-TMSI). N_UG<=L_f and can be either defined in the specification of system operation or provided to the UE through any physical layer signal/channel in an SSB. For example, N_UG is indicated in the content of PBCH. The SSB burst set n_f for initial access can be associated with UE group ID, such that n_f=mod (n_UG, L_f).

Figure 26:
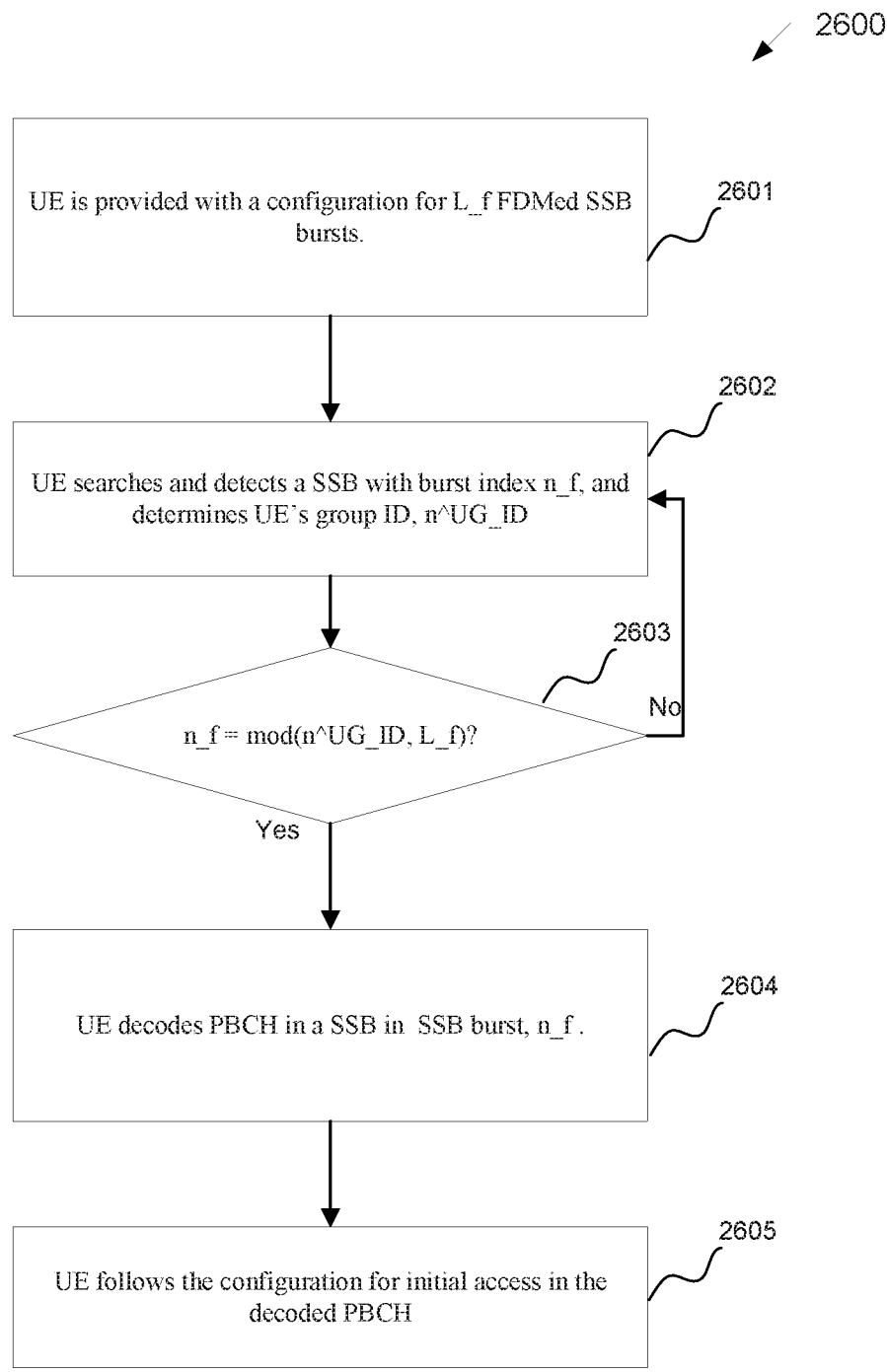
FIG. 26 illustrates a flowchart of a method for SSB reception of UE according to embodiments of the present disclosure.

FIG. 26 illustrates a flowchart of a method 2600 for SSB reception of UE according to embodiments of the present disclosure. An embodiment of the method 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions. Other embodiments are used without departing from the scope of the present disclosure.

FIG. 26 illustrates an example of a UE procedure for SSB reception based on the distribution UEs for initial access.

As illustrated in FIG. 26, a UE is provided with a configuration of L_f FDMed SSB bursts from the specification of the system operation in step 2601. The UE detects an SSB with burst index n_f, and determines a UE group ID, n^UG_ID in step 2602. The UE then determines whether or not the detected SSB burst set is the set for UEs associated with UE group n^UG_ID, such that whether or not n_f equals mod(n^UG_ID, L_f) in step 2603. If n_f=mod (n^UG_ID, L_f), the UE decodes PBCH in an SSB within SSB burst #n_f in step 2604. The UE follows the configuration for initial access in the decoded PBCH in step 2605. If n_f≠mod (n^UG_ID, L_f), the UE goes back to search and detect other SSB burst in step 2602.

For any SSB based CSI measurement or report, a UE can assume any of the following: in one example, the UE assumes only SSB in first burst index #0 is used for cell-specific measurement and report, for example RRM measurement for cell reselection or handover; and in another example, the UE is configured to measure and report CSI associated with a SSB with predetermined frequency domain index, and time domain index.

Figure 27:
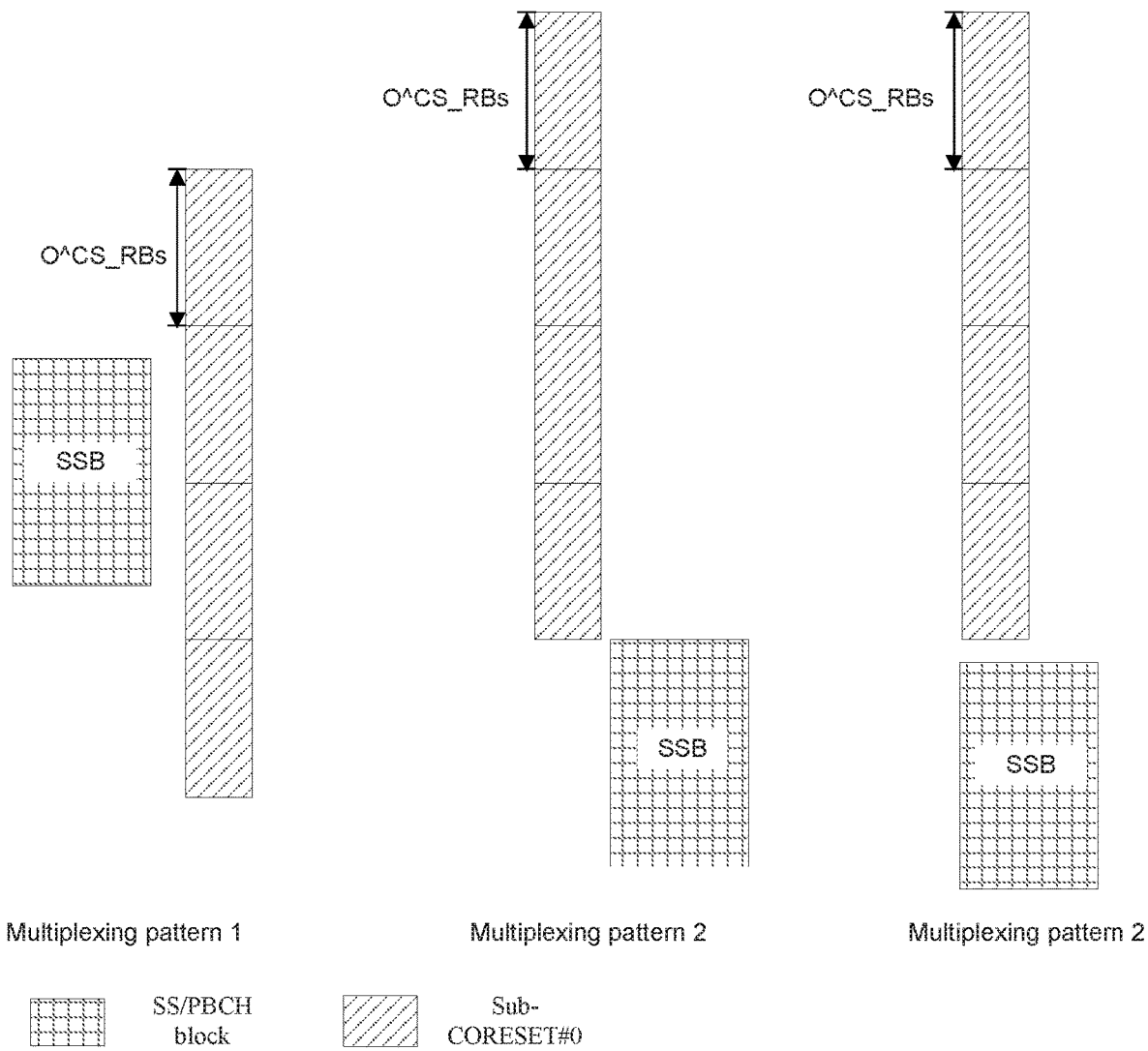
FIG. 27 illustrates an example SSB multiplexing according to embodiments of the present disclosure.

FIG. 27 illustrates an example SSB multiplexing 2700 according to embodiments of the present disclosure. An embodiment of the SSB multiplexing 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions. Other embodiments are used without departing from the scope of the present disclosure.

In one embodiment, CORESET #0 configured by MIB of PBCH is divided into multiple sub-CORESETs, which is applicable to at least NR-light UEs. As illustrated in FIG. 27, the CORESET #0 multiplexed with a SS/PBCH block (SSB) can be divided into $K\_CS \geq 1$ sub-CORESETs, wherein each sub-CORESET is referred as sub-CORESET #0 in this disclosure.

For an associated UE, the UE determines the number of symbols for a sub-CORESET #0 using at least one of the following examples.

In one example, the UE assumes the sub-CORESET #0 has same OFDM symbols as the associated CORESET #0.

In another example, the UE assumes the number of OFDM symbols for the sub-CORESET #0 is scaled up accordingly to the factor that the BW of the sub-CORESET #0 is scaled down, comparing with the associated CORESET #0, such that the total resources for the sub-CORESET #0 maintains the same as the associated CORESET #0.

In yet another example, the UE is indicated with the number of symbols for a sub-CORESET #0.

A UE can be provided with any of the following to determine the assigned RBs for a sub-CORESET #0: in one example, the UE is provided with a BW of sub-CORESET #0 in terms of number of RBs, i.e., $O\char`^CS\_RBs$. In this case, the UE determines the RBs for $i^{th}$ sub-CORESET #0 as $n0\_RB+i*O\char`^CS\_RBs, \ldots, n0\_RB+i*O\char`^CS\_RBs+O\char`^CS\_RBs-1$, where $i=0, \ldots, K\_CS-1$; $K\_CS=(N\_RBs/O\char`^CS\_RBs)$; $N\_RBs$ is the number of RBs of associated CORESET #0, $n0\_RB$ is the smallest RB index of associated CORESET #0; and in another example, the UE is provided with a number of sub-CORESET #0, $K\_CS$. In this case, the UE determines the RBs for $i^{th}$ sub-CORESET #0 as $n0\_RB+i*O\char`^CS\_RBs, \ldots, n0\_RB+i*O\char`^CS\_RBs+O\char`^CS\_RBs-1$, where $i=0, \ldots, K\_CS-1$, $n0\_RB$ is the smallest RB index of associated CORESET #0, $O\char`^CS\_RBs$ is the number of RBs of a sub-CORESET #0, such that $O\char`^CS\_RBs=\text{floor}(N\_RBs/K\_CS)$, and $N\_RBs$ is the number of RBs of associated CORESET #0.

In one example for the configuration of sub-CORESET #0, the configuration includes an antenna port quasi co-location (QCL), indicating QCL information of the DM-RS antenna port for PDCCH receptions in sub-CORESET #0. The antenna port QCL can be determined as one of: the antenna port QCL of sub-CORESET #0 that is QCLed with one or more DL RS provided by a TCI state, where the TCI state is indicated by a MAC CE activation command for the sub-CORESET #0; the antenna port QCL of sub-CORESET #0 that is QCLed with an associated SS/PBCH that the UE identified during a most recent random access procedure not initiated by a PDCCH order that triggers a non-contention based random access procedure, if no MAC CE activation command indicting a TCI state for the sub-CORESET #0 is received after the most recent random access procedure; or the antenna port QCL of sub-CORESET #0 that is same as NR Rel-15 CORESET #0. The QCL properties (TCI state) for a PDCCH reception in sub-CORESET #0 is determined by the antenna port quasi co-location of the sub-CORESET #0.

The configuration of sub-CORESET #0 can be either defined in the specification of the system operation, for example, $O\char`^CS\_RBs=12$ or $K\_CS=2$, or provided to UE through any physical layer signal/channel in associated SSB, for example, the reserved bits in the content of PBCH.

A UE is expected to monitor at least one of the following PDCCH in a CSS set associated with a sub-CORESET #0 with index i, $0<=i<. K\_CS-1$.

In one example, the UE is expected to monitor Type0-PDCCH or DCI formats with CRC scrambled by SI-RNTI for scheduling information of RMSI.

In another example, the UE is expected to monitor Type0A-PDCCH or DCI formats with CRC scrambled by SI-RNTI for scheduling information of SIB.

In yet another example, the UE is expected to monitor Type1-PDCCH or DCI formats with CRC scrambled by RA-RNTI or TC-RNTI or C-RNTI In yet another example, the UE is expected to monitor Type2-PDCCH or DCI formats with CRC scrambled by P-RNTI.

In one embodiment, the configuration of a CSS set associated with sub-CORESET #0 for Type0-PDCCH monitoring can be provided to the UE through the content of PBCH.

In one embodiment, the configuration of a CSS set associated with sub-CORESET #0 for Type0-PDCCH monitoring can be determined by the UE based on the configuration of a CSS set associated with the associated CORESET #0 for Type0-PDCCH monitoring. For example, a fixed time-domain offset is assumed by the UE between the CSS set associated with sub-CORESET #0 and CORESET #0.

In one embodiment, the configuration of a CSS set associated with sub-CORESET #0 other than Type0-PDCCH CSS set can be provided to UE through RMSI or other SIB in PDSCH.

For PDCCH monitoring in a CSS set associated with a sub-CORESET #0, a UE can determine the index of associated sub-CORESET #0 through one of the following.

In one example, the UE arbitrarily select one or more sub-CORESET #0 for PDCCH monitoring in a CSS set associated with CORESET #0 from all the possible sub-CORESET #Os associated with the CORESET #0.

In another example, the UE can arbitrarily select one or more sub-CORESET #0 for PDCCH monitoring in a CSS set associated with CORESET #0 from a set of sub-CORESET #Os configured by the gNB (e.g., indicated by PBCH or enhanced PBCH).

In yet another example, the UE assumes a fixed sub-CORESET #0 for PDCCH monitoring in a CSS set associated with CORESET #0. For example, the sub-CORESET #0 with lowest RBs or the sub-CORESET #0 with highest RBs is assumed for Type0-PDCCH monitoring for scheduling information for RMSI.

In yet another example, the index of one or more associated sub-CORESET #0 is indicated in the configuration of the associated CSS set. For example, the content of PBCH, such as reserved bits, can be used to indicate one or more sub-CORESET #0 for Type0-PDCCH monitoring.

In yet another example, the index of associated sub-CORESET #0, for PDCCH monitoring is associated with UE ID, $n\char`^UE\_ID$, such that $i=\text{mod}(n\char`^UE\_ID, K\_CS)$. In this case, UEs are distributed into different sub-CORESET #0 for PDCCH monitoring. The UE ID can be or be derived from the International Mobile Subscriber Identity (IMSI), or SAE Temporary Mobile Subscriber Identity (s-TMSI).

Figure 28:
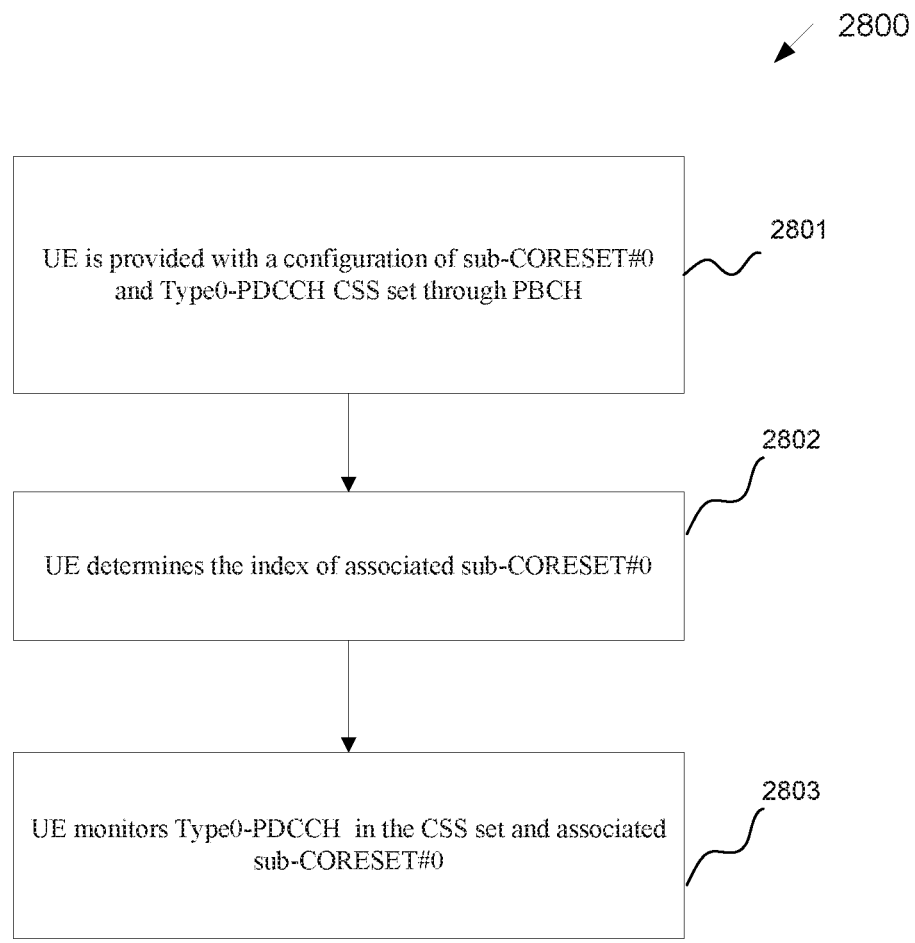
FIG. 28 illustrates a flowchart of a method for type0-PDCCH monitoring of UE according to embodiments of the present disclosure.

FIG. 28 illustrates a flowchart of a method 2800 for type0-PDCCH monitoring of UE according to embodiments of the present disclosure. An embodiment of the method 2800 shown in FIG. 28 is for illustration only. One or more of the components illustrated in FIG. 28 can be implemented in specialized circuitry configured to perform the noted functions or one or more of the components can be implemented by one or more processors executing instructions to perform the noted functions. Other embodiments are used without departing from the scope of the present disclosure.

FIG. 28 illustrates an example of a UE procedure for Type0-PDCCH monitoring in sub-CORESET #0.

As illustrated FIG. 28, a UE is provided with a configuration of sub-CORESET #0 and Type0-PDCCH CSS set through PBCH in step 2801. The UE determines the index of one or more associated sub-CORESET #0 for Type-PDCCH monitoring in step 2802. For example, the associated sub-CORESET #0 is the sub-CORESET #0 with highest RBs indices. The UE then monitors Type0-PDCCH in the CSS set and associated sub-CORESET #0 in step 2803.

Figure 29:
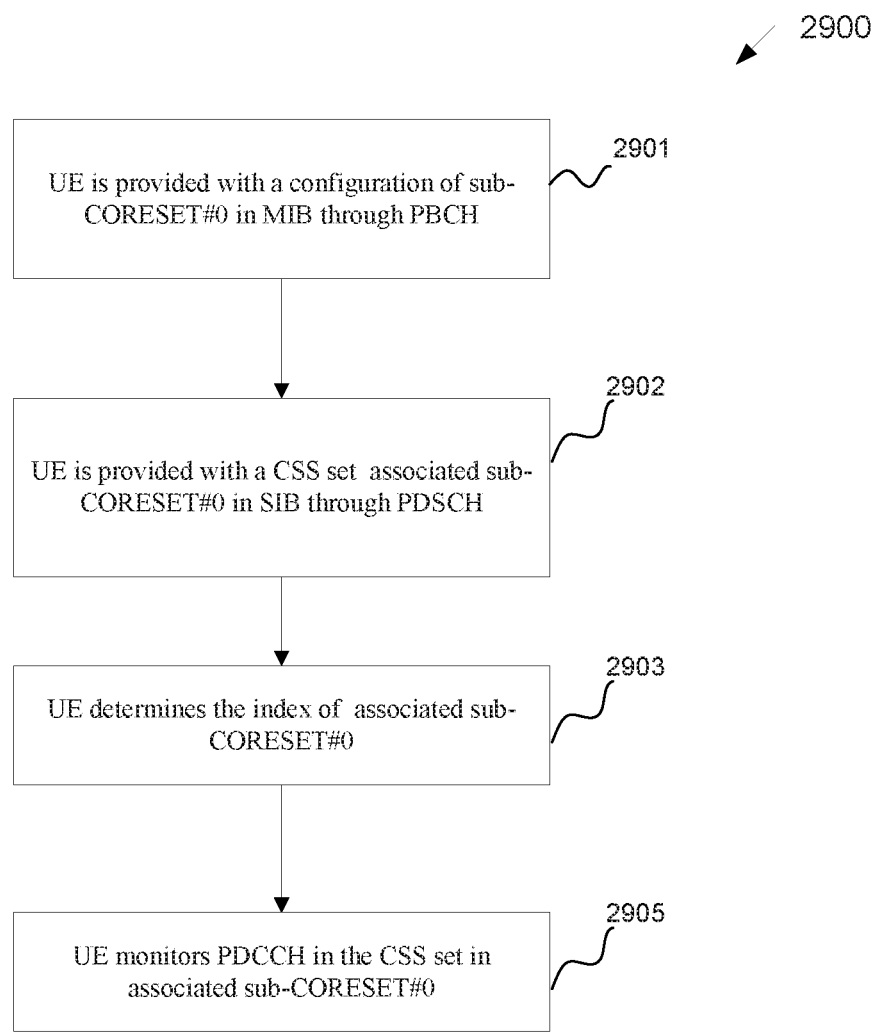
FIG. 29 illustrates another flowchart of a method for type0-PDCCH monitoring of UE according to embodiments of the present disclosure.

FIG. 29 illustrates another flowchart of a method 2900 for type0-PDCCH monitoring of UE according to embodiments of the present disclosure. An embodiment of the method 2900 shown in FIG. 29 is for illustration only. One or more of the components illustrated in FIG. 29 can be implemented in specialized circuitry configured to perform the noted functions or one or more of the components can be implemented by one or more processors executing instructions to perform the noted functions. Other embodiments are used without departing from the scope of the present disclosure.

FIG. 29 illustrates an example of a UE procedure for PDCCH monitoring in sub-CORESET #0 and CSS set configured by SIB.

As illustrated in FIG. 29, a UE is provided with a configuration of sub-CORESET #0 through PBCH, such as the reserved bits in the content of PBCH in step 2901. The UE is also provided with a CSS set associated with sub-CORESET #0 in SIB through PDSCH in step 2902. The UE then determines the index of associated sub-CORESET #0 in step 2903. For example, the associated sub-CORESET #0 with index i is determined by UE ID, n^UE_ID, such that i=mod (n^UE_ID, K_CS). The UE then monitors PDCCH in the CSS set in associated sub-CORESET #0 in step 2905.

Figure 30:
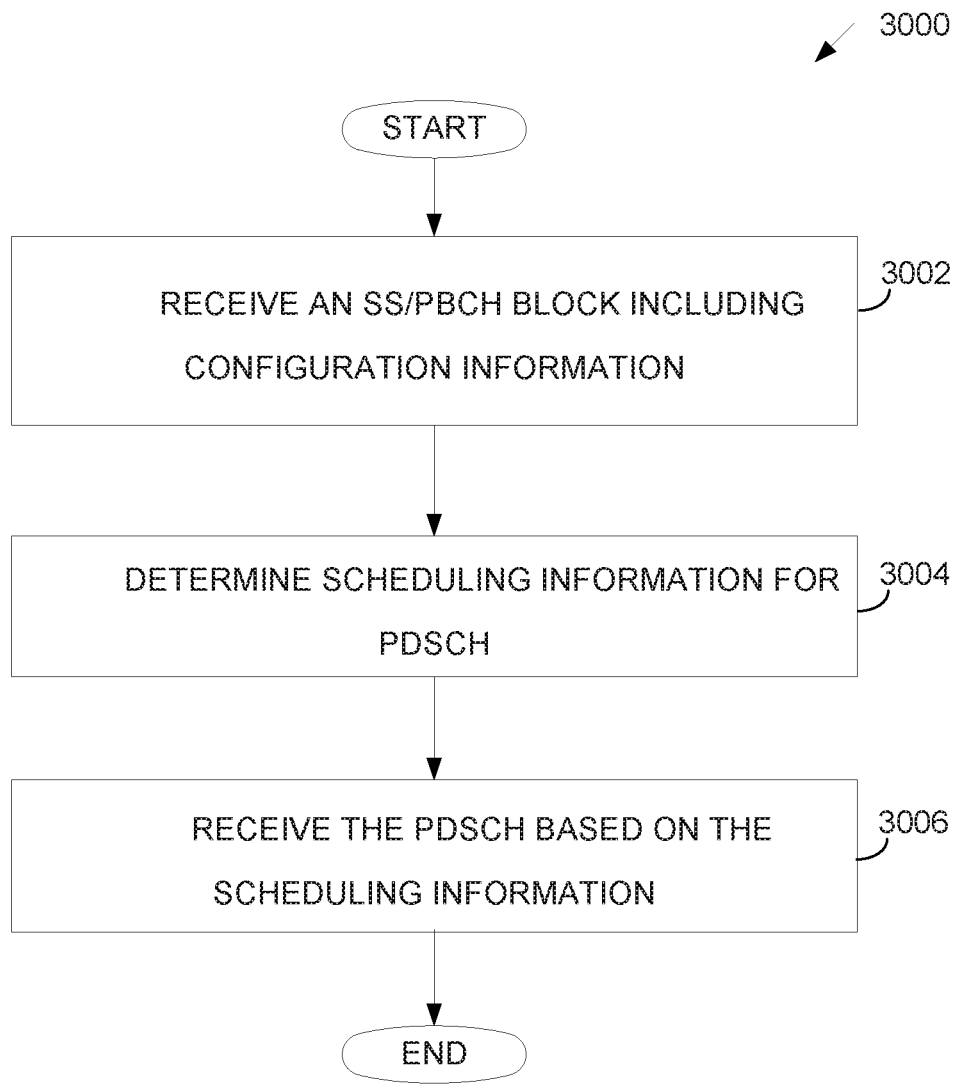
FIG. 30 illustrates a flow chart of a method for SS/PBCH block repetition according to embodiments of the present disclosure.

FIG. 30 illustrates a flow chart of a method 3000 for SS/PBCH block repetition according to embodiments of the present disclosure, as may be performed by a user equipment (UE) (e.g., 111-116 as illustrated in FIG. 1). An embodiment of the method 3000 shown in FIG. 30 is for illustration only. One or more of the components illustrated in FIG. 30 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 30, the method 300 begins at step 3002, in step 3002, the UE receives a synchronization signal/physical broadcast channel (SS/PBCH) block that includes configuration information for one or more search space sets.

In one embodiment, the SS/PBCH block includes first configuration information for a first control resource set (CORESET).

In one embodiment, the UE further determines, for a second CORESET, second configuration information that includes one or more parameters of an identity, antenna port quasi co-location (QCL) information of a demodulation-reference signal (DM-RS) antenna port associated with a PDCCH reception in the second CORESET, a bandwidth in a number of resource blocks (RB), an RB offset between a lowest RB index of the second CORESET and a lowest RB index of the SS/PBCH block, or a number of symbols.

In one embodiment, the bandwidth of the second CORESET is within a bandwidth of the first CORESET and the second search space set is associated with the second CORESET.

In one embodiment, a search space set includes parameters for a physical downlink control channel (PDCCH) reception that includes a DCI format.

In one embodiment, a parameter of the configuration information for the second search space set is one of a periodicity in a number of slots, a duration in a number of slots, a starting slot, or a first symbol.

In one embodiment, a value of the parameter is one of same as a corresponding parameter for a third search space set, determined from a value of the parameter for a third search space set, or predetermined.

Subsequently, in step 3004, the UE determines scheduling information for a first physical downlink shared channel (PDSCH) reception based on one of a first downlink control information (DCI) format associated with a first search space set from the one or more search space sets, or a second DCI format associated with a second search space set from the one or more search space sets.

In such embodiment, the first DCI format includes the scheduling information for the first PDSCH reception and for a second PDSCH reception and the second DCI format includes the scheduling information for the first PDSCH reception.

In one embodiment, the second search space set is used for receiving PDCCHs according to a common search space.

In one embodiment, the second DCI format includes cyclic redundancy check (CRC) bits that are scrambled by bits for one of a system information-radio network temporary identifier (SI-RNTI), a paging-RNTI (P-RNTI), or a random access-RNTI (RA-RNTI).

In one embodiment, a parameter of the scheduling information for the first PDSCH reception is one of a frequency domain resource allocation, a time domain resource allocation, or a modulation and coding scheme.

In one embodiment, the first DCI format provides a value of the parameter according to one of (i) wherein the value is same for the first PDSCH reception and the second PDSCH reception, (ii) wherein the value is for the second PDSCH reception and another value is derived from the value for the first PDSCH reception, or (iii) wherein a first value is for the first PDSCH reception and a second value is for the second PDSCH reception.

Finally, the UE in step 3006 receives the first PDSCH based on the scheduling information.

In one embodiment, the UE further determines a value of a parameter for the second CORESET. In such embodiment, the value is one of a same value as a value of the parameter for the first CORESET, determined based on an indication in the SS/PBCH block, or a predetermined value.

In one embodiment, the UE further determines a UE identity and the second CORESET based on one of the UE identity, a bandwidth that is within a bandwidth for the first CORESET, or an indication in the SS/PBCH block.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive a synchronization signal/physical broadcast channel (SS/PBCH) block that includes configuration information for one or two search space sets; and
a processor operably coupled to the transceiver, the processor configured to determine scheduling information for a reception of a first physical downlink shared channel (PDSCH) based on:
when the configuration information is for the one search space set, a first downlink control information (DCI) format associated with a first search space set from the one or two search space sets, wherein the first DCI format includes the scheduling information for the first PDSCH reception and for a second PDSCH reception, and
when the configuration information is for the two search space sets, a second DCI format associated with a second search space set from the one or two search space sets, wherein the second DCI format includes the scheduling information for the first PDSCH reception,
wherein the transceiver is further configured to receive the first PDSCH based on the scheduling information.

2. The UE of claim 1, wherein:
a parameter of the scheduling information for the first PDSCH reception comprises one of: a frequency domain resource allocation, a time domain resource allocation, or a modulation and coding scheme; and
the first DCI format provides a value of the parameter according to one of:
(i) wherein the value is same for the first PDSCH reception and the second PDSCH reception,
(ii) wherein the value is for the second PDSCH reception and another value is derived from the value for the first PDSCH reception, or
(iii) wherein a first value is for the first PDSCH reception and a second value is for the second PDSCH reception.

3. The UE of claim 1, wherein:
a search space set provides parameters for a physical downlink control channel (PDCCH) reception that includes a DCI format;
a parameter of the configuration information for the second search space set comprises one of a periodicity in a number of slots, a duration in a number of slots, a starting slot, or a first symbol; and
a value of the parameter is one of:
same as a corresponding parameter for a third search space set,
determined from a value of the parameter for a third search space set, or predetermined.

4. The UE of claim 1, wherein:
the SS/PBCH block includes first configuration information for a first control resource set (CORESET),
the processor is further configured to determine, for a second CORESET, second configuration information that includes one or more parameters of an identity, antenna port quasi co-location (QCL) information of a demodulation-reference signal (DM-RS) antenna port associated with a PDCCH reception in the second CORESET, a bandwidth in a number of resource blocks (RB), an RB offset between a lowest RB index of the second CORESET and a lowest RB index of the SS/PBCH block, or a number of symbols; and
the bandwidth of the second CORESET is within a bandwidth of the first CORESET, and the second search space set is associated with the second CORESET.

5. The UE of claim 4, wherein the processor is further configured to determine a value of a parameter for the second CORESET, the value being one of:
a same value as a value of the parameter for the first CORESET,
determined based on an indication in the SS/PBCH block, or
a predetermined value.

6. The UE of claim 1, wherein the second search space set is used for receiving PDCCHs according to a common search space, and the second DCI format includes cyclic redundancy check (CRC) bits that are scrambled by bits for one of: a system information-radio network temporary identifier (SI-RNTI), a paging-RNTI (P-RNTI), or a random access-RNTI (RA-RNTI).

7. The UE of claim 5, wherein the processor is further configured to:
determine a UE identity; and
determine the second CORESET based on one of:
the UE identity,
a bandwidth that is within a bandwidth for the first CORESET, or
an indication in the SS/PBCH block.

8. A base station (BS) comprising:
a processor configured to:
include configuration information for one or two search space sets in a synchronization signal/physical broadcast channel (SS/PBCH) block, and
include scheduling information for a transmission of a first physical downlink shared channel (PDSCH) based on:
when the configuration information is for the one search space set, a first downlink control information (DCI) format associated with a first search space set from the one or two search space sets, wherein the first DCI format includes the scheduling information for the first PDSCH transmission and for a second PDSCH transmission, and
when the configuration information is for the two search space sets, a second DCI format associated with a second search space set from the one or two search space sets, wherein the second DCI format includes the scheduling information for the first PDSCH transmission; and
a transceiver operably coupled to the processor, the transceiver configured to:
transmit the SS/PBCH block, and
transmit the first PDSCH based on the scheduling information.

9. The BS of claim 8, wherein:
a parameter of the scheduling information for the first PDSCH transmission comprises one of: a frequency domain resource allocation, a time domain resource allocation, or a modulation and coding scheme; and
the first DCI format provides a value of the parameter according to one of:
(i) wherein the value is same for the first PDSCH transmission and the second PDSCH transmission,
(ii) wherein the value is for the second PDSCH transmission and another value is derived from the value for the first PDSCH transmission, or (iii) wherein a first value is for the first PDSCH transmission and a second value is for the second PDSCH transmission.

10. The BS of claim 8, wherein:
a search space set provides parameters for a physical downlink control channel (PDCCH) transmission that includes a DCI format;
a parameter of the configuration information for the second search space set comprises one of a periodicity in a number of slots, a duration in a number of slots, a starting slot, or a first symbol; and
a value of the parameter is one of:
  same as a corresponding parameter for a third search space set,
  determined from a value of the parameter for a third search space set, or predetermined.

11. The BS of claim 8, wherein:
the SS/PBCH block includes first configuration information for a first control resource set (CORESET);
the processor is further configured to, for a second CORESET, second configuration information that includes one or more parameters of an identity, antenna port quasi co-location (QCL) information of a demodulation-reference signal (DM-RS) antenna port associated with a PDCCH transmission in the second CORESET, a bandwidth in a number of resource blocks (RB), an RB offset between a lowest RB index of the second CORESET and a lowest RB index of the SS/PBCH block, or a number of symbols; and
the bandwidth of the second CORESET is within a bandwidth of the first CORESET, and the second search space set is associated with the second CORESET.

12. The BS of claim 11, wherein the processor is further configured to provide a value of a parameter for the second CORESET, the value being one of:
a same value as a value of the parameter for the first CORESET,
determined based on an indication in the SS/PBCH block, or
a predetermined value.

13. The BS of claim 8, wherein the second search space set is used for transmitting PDCCHs according to a common search space, and the second DCI format includes cyclic redundancy check (CRC) bits that are scrambled by bits for one of: a system information-radio network temporary identifier (SI-RNTI), a paging-RNTI (P-RNTI), or a random access-RNTI (RA-RNTI).

14. The BS of claim 12, wherein the processor is further configured to:
identify a UE identity; and
provide the second CORESET based on one of:
  the UE identity,
  a bandwidth that is within a bandwidth for the first CORESET, or
  an indication in the SS/PBCH block.

15. A method of a user equipment (UE), the method comprising:
receiving a synchronization signal/physical broadcast channel (SS/PBCH) block that includes configuration information for one or two search space sets;
determining scheduling information for a reception of a first physical downlink shared channel (PDSCH) based on:
  when the configuration information is for the one search space set, a first downlink control information (DCI) format associated with a first search space set from the one or two search space sets, wherein the first DCI format includes the scheduling information for the first PDSCH reception and for a second PDSCH reception, and
  when the configuration information is for the two search space sets, a second DCI format associated with a second search space set from the one or two search space sets, wherein the second DCI format includes the scheduling information for the first PDSCH reception; and
receiving the first PDSCH based on the scheduling information.

16. The method of claim 15, wherein:
a parameter of the scheduling information for the first PDSCH reception comprises one of a frequency domain resource allocation, a time domain resource allocation, or a modulation and coding scheme; and
the first DCI format provides a value of the parameter according to one of:
  (i) wherein the value is same for the first PDSCH reception and the second PDSCH reception,
  (ii) wherein the value is for the second PDSCH reception and another value is derived from the value for the first PDSCH reception, or
  (iii) wherein a first value is for the first PDSCH reception and a second value is for the second PDSCH reception.

17. The method of claim 15, wherein:
a search space set provides parameters for a physical downlink control channel (PDCCH) reception that includes a DCI format;
a parameter of the configuration information for the second search space set comprises one of a periodicity in a number of slots, a duration in a number of slots, a starting slot, or a first symbol; and
a value of the parameter is one of:
  same as a corresponding parameter for a third search space set,
  determined from a value of the parameter for a third search space set, or predetermined.

18. The method of claim 15, further comprising determining, for a second control resource set (CORESET), second configuration information that includes one or more parameters of an identity, antenna port quasi co-location (QCL) information of a demodulation-reference signal (DM-RS) antenna port associated with a PDCCH in the second CORESET, a bandwidth in a number of resource blocks (RB), an RB offset between a lowest RB index of the second CORESET and a lowest RB index of the SS/PBCH block, or a number of symbols,
wherein:
  the SS/PBCH block includes first configuration information for a first CORESET;
  the bandwidth of the second CORESET is within a bandwidth of the first CORESET; and
  the second search space set is associated with the second CORESET.

19. The method of claim 18, further comprising determining a value of a parameter for the second CORESET, the value being one of:
a same value as a value of the parameter for the first CORESET,
determined based on an indication in the SS/PBCH block, or
a predetermined value.

20. The method of claim 19, further comprising:
determining a UE identity; and
determining the second CORESET based on one of the UE identity, a bandwidth that is within a bandwidth for the first CORESET, or an indication in the SS/PBCH block,
wherein the second search space set is used for receiving PDCCHs according to a common search space, and the second DCI format includes cyclic redundancy check (CRC) bits that are scrambled by bits for one of: a system information-radio network temporary identifier (SI-RNTI), a paging-RNTI (P-RNTI), or a random access-RNTI (RA-RNTI).

* * * * *